(12) United States Patent
Stubbs

(10) Patent No.: US 11,299,637 B2
(45) Date of Patent: Apr. 12, 2022

(54) WEATHER-RESISTANT TEMPORARY PAINT SYSTEM COMPRISING A REMOVABLE PAINT COMPOSITION AND A REMOVER COMPOSITION

(71) Applicant: Renu TPS Limited, York (GB)

(72) Inventor: Peter Stubbs, York (GB)

(73) Assignee: Renu TPS Limited, York (GB)

( * ) Notice: Subject to any disclaimer, the term of this patent is extended or adjusted under 35 U.S.C. 154(b) by 110 days.

(21) Appl. No.: 16/612,802

(22) PCT Filed: May 1, 2018

(86) PCT No.: PCT/GB2018/051163
§ 371 (c)(1),
(2) Date: Nov. 12, 2019

(87) PCT Pub. No.: WO2018/206918
PCT Pub. Date: Nov. 15, 2018

(65) Prior Publication Data
US 2020/0148890 A1    May 14, 2020

(30) Foreign Application Priority Data
May 12, 2017   (GB) ..................................... 1707669

(51) Int. Cl.
| C09D 133/08 | (2006.01) |
| C09D 133/10 | (2006.01) |
| C09D 123/08 | (2006.01) |
| C08K 5/09 | (2006.01) |
| C09D 5/00 | (2006.01) |
| C08K 3/22 | (2006.01) |
| C08K 3/26 | (2006.01) |
| C08K 3/32 | (2006.01) |
| C08K 5/17 | (2006.01) |
| C09D 5/02 | (2006.01) |
| C09D 9/00 | (2006.01) |
| C09D 17/00 | (2006.01) |
| C09D 125/08 | (2006.01) |
| C09D 133/02 | (2006.01) |
| C09D 133/06 | (2006.01) |
| C09D 133/26 | (2006.01) |

(52) U.S. Cl.
CPC ................ C09D 5/008 (2013.01); C08K 3/22 (2013.01); C08K 3/26 (2013.01); C08K 3/32 (2013.01); C08K 5/17 (2013.01); C09D 5/021 (2013.01); C09D 9/00 (2013.01); C09D 17/003 (2013.01); C09D 17/004 (2013.01); C09D 123/08 (2013.01); C09D 125/08 (2013.01); C09D 133/02 (2013.01); C09D 133/064 (2013.01); C09D 133/08 (2013.01); C09D 133/10 (2013.01); C09D 133/26 (2013.01); *C08K 2003/2206* (2013.01); *C08K 2003/262* (2013.01); *C08K 2003/265* (2013.01); *C08K 2003/324* (2013.01); *C08K 2003/325* (2013.01)

(58) Field of Classification Search
CPC .. C09D 123/08; C09D 125/08; C09D 133/02; C09D 133/064; C09D 133/08; C09D 133/10; C09D 133/26; C09D 5/008; C09D 9/00
See application file for complete search history.

(56) References Cited

U.S. PATENT DOCUMENTS

| 5,041,488 | A | 8/1991 | Meades | |
| 6,106,577 | A * | 8/2000 | Audousset | A61K 8/8147 8/403 |
| 10,125,268 | B2 * | 11/2018 | Rogers | C09D 133/08 |
| 2003/0230642 | A1 | 12/2003 | Jung | |
| 2008/0241371 | A1 * | 10/2008 | Havelka | C09D 5/008 427/154 |
| 2008/0268140 | A1 * | 10/2008 | Akhtar | C09D 5/008 427/154 |
| 2015/0152277 | A1 | 6/2015 | Akhtar et al. | |

FOREIGN PATENT DOCUMENTS

| EP | 0872265 A1 | 10/1998 |
| EP | 930349 A1 * | 7/1999 |
| EP | 0930349 A1 | 7/1999 |
| FR | 2295100 A | 7/1976 |
| WO | 9001051 A1 | 2/1990 |

OTHER PUBLICATIONS

UK Search and Examination Report issued in counterpart EP Application No. GB1707669.6 dated Jun. 5, 2017 (six (6) pages).

* cited by examiner

*Primary Examiner* — Karuna P Reddy
(74) *Attorney, Agent, or Firm* — E. Eric Mills; Nexsen Pruet, PLLC

(57) ABSTRACT

A paint system comprising a first component and a second component wherein said first and second components are separate compositions, wherein said first component is a removable paint composition comprising: (i) an organic solvent component comprising or consisting of one or more organic solvent(s); (ii) a polymeric component comprising a polymeric binder; (iii) a pigment component; and (iv) optionally one or more acid(s), and wherein said second component is a remover composition for removing said first component from a surface of a substrate wherein said remover composition comprises: (i) water and (ii) a base.

21 Claims, 1 Drawing Sheet

(a)

(b)          (c)

(d)          (e)

(f)          (g)

(h)

WEATHER-RESISTANT TEMPORARY PAINT SYSTEM COMPRISING A REMOVABLE PAINT COMPOSITION AND A REMOVER COMPOSITION

CROSS REFERENCE TO RELATED APPLICATIONS

The presently disclosed subject matter is related and claims priority to International PCT Application No. PCT/GB2018/051163, entitled "WEATHER-RESISTANT TEMPORARY PAINT SYSTEM COMPRISING A REMOVABLE PAINT COMPOSITION AND A REMOVER COMPOSITION," filed on May 1, 2018 and which claims priority to Great Britain Application No. 1707669.6, filed on May 12, 2017; the entire disclosures of which are incorporated herein by reference.

The present invention relates to a removable or temporary paint system, a paint composition and a method of decorating or protecting a surface. The paint system of the present invention reduces or eliminates the use of harsh and/or environmentally unfriendly chemicals There are many different types of paints, decorative and/or protective. The essential ingredients of most paints are a pigment or dye, a binder (also referred to in the art as a vehicle) and a solvent (also referred to in the art as a thinner). The pigment or dye in a paint gives the paint its colour and the ability to hide a surface, and typically also provides hardness and bulk. Pigments are generally preferred over dyes because pigments tend to last longer. The binder is normally the component of the paint composition which facilitates film formation on the surface to which the paint is applied and provides adhesion to that surface. A variety of binders are known in the art, including vegetable oils and natural or synthetic polymeric resins. The solvent component facilitates the application of the paint, for instance to allow a paint to flow freely, and usually evaporates after the paint is applied. Typical solvents include water and organic solvents such as alcohols, toluene, turpentine or mineral spirit (also known as white spirit or petroleum spirits; and is a mixture of aliphatic and alicyclic $C_7$ to $C_{12}$ hydrocarbons). A variety of other functional ingredients are typically added to a paint composition, including fillers, opacifiers, surfactants, adhesion promoters, coupling agents and antimicrobial agents.

The adhesion of the paint to the surface results from the physico-chemical changes which occur in the paint composition upon its application, both at the surface-paint interfacial boundary and the intra-molecular interactions within the paint composition. These physico-chemical changes determine the two basic properties of the paint coating: cohesion and adhesion. Cohesion is the intrinsic strength of the paint coating itself and is determined by the strength of the molecular forces in the bulk material (which is normally measured by conventional tensile and elongation tests such as ASTM D638). Adhesion is the strength of the bonds which form between the paint coating and the surface of the substrate to which the paint is applied. The durability and/or performance of a paint coating depends on its cohesive strength and its adhesive strength, and both are required for a long-lasting, protective coating. Cohesive failure is usually defined (and is defined herein) as occurring in the paint film itself, although could also be within the substrate (for instance, the rotting or splintering of wood). Adhesive failure occurs at the surface-paint interfacial boundary.

The adhesive property of coatings to a surface has been defined by various basic mechanisms: adsorption, chemical, and mechanical interlocking. In the process of adsorption, the molecules in the paint film wet or flow freely over the substrate, resulting in intimate contact between the molecules of the two materials and the resultant attractive forces (usually designated as secondary or van der Waals forces) form an interfacial bond between the paint and the substrate. Chemical adhesion occurs when chemical bonds are formed at the interface between the paint and the substrate. In the process of mechanical interlocking, the paint film wets and penetrates the roughness on the substrate surface. Good adhesion does not require all three of these mechanisms simultaneously, but good wetting or adsorption is central to most paint systems.

For conventional paint compositions, the objective of the paint formulator is typically to maximize both the cohesive and adhesive strength of the paint, in particular to maximize the adhesive force between paint and substrate in order to provide permanent and long-lasting adhesion. However, this normally results in staining and/or irreversible damage to the surface of the substrate. While it is known in the art that paint coatings can be removed from a substrate via abrasion or the application of harsh chemical treatments, such removal normally results in irreversible damage to the substrate, and is a time-consuming and laborious activity. It would be desirable to avoid one or more of those problems.

It is therefore an object of this invention to provide a paint composition, and a paint system comprising said paint composition, wherein the paint composition exhibits excellent cohesive and adhesive strength when applied to a substrate yet is easily removed from a substrate without staining and/or damage of the substrate. It is a further objective of the present invention to provide such a paint composition, and a paint system comprising said paint composition, wherein the paint composition is removable from a substrate without abrasion and without harsh and/or toxic and/or environmentally unfriendly chemical treatments.

According to a first aspect of the invention, there is provided a paint composition comprising, consisting essentially of or consisting of:

(i) an organic solvent component comprising or consisting of one or more organic solvent(s);

(ii) a polymeric component comprising a polymeric binder;

(iii) a pigment component; and (iv) optionally one or more acid(s).

Preferably, the paint composition comprises, consists essentially of or consists of (i) said organic solvent component in an amount of from about 30 to about 70, preferably at least about 40, preferably at least about 50, preferably from about 55 to about 70% by weight of said composition;

(ii) said polymeric component in an amount of from about 10 to about 30, preferably at least about 15, preferably no more than about 25, preferably from about 15 to about 25% by weight of said composition;

(iii) said pigment component in an amount of at least about 1, preferably at least about 2, at least about 5, preferably at least about 8, preferably no more than about 55, typically no more than about 45, typically no more than about 35, typically no more than about 25, preferably from about 8 to about 20% by weight of said composition; and (iv) optionally said acid(s) in an amount of from about 0.1 to about 1.0% by weight of said composition.

Preferably, the amounts of components (i) to (iv) make up at least 50%, preferably at least 70%, preferably at least 80%, preferably at least 90%, preferably at least 95%, and in one embodiment 100% of the paint composition. However, the paint composition may optionally comprise minor amounts of one or more other active ingredients or adjuvants typically used in paint formulations, such as coalescents, plasticizers, thickeners and other rheology modifiers, anti-cratering agents; biocides, fungicides, mildew-cides; preservatives; heat stabilizers; leveling agents; light stabilizers; optical brighteners; ultraviolet light absorbers; wetting agents; and the like. Representative adjuvants are described in Koleske et al., Paint and Coatings Industry, April, 2003, pages 12-86. Typically, each of such ingredients is present in an amount of no more than about 5%, preferably no more than about 3% by weight of the paint composition.

The paint composition of the present invention is a film-forming composition.

Without being limited by theory, it is the inventors' understanding that in the present invention the polymeric binder not only facilitates film formation and adhesion of the paint composition to the substrate onto which the paint composition is applied, but also protects the substrate from staining or damage by the pigment. Thus, it is the inventors' understanding that when the paint compositions of the present invention are applied to a substrate, the cohesive force between the pigment component and the other components of the paint composition (in particular the polymeric binder) is greater than the adhesive force of the pigment component to the substrate onto which the paint composition is applied. Thus, it is the inventors' understanding that when the paint compositions of the present invention are applied to a substrate, the inter-molecular attractive force between the pigment component and the polymeric binder is greater than the attractive force between the pigment component and the substrate onto which the paint composition is applied.

It is the inventors' understanding that the polymeric binder serves to substantially prevent contact between the pigment component and the substrate. In particular, it is the inventors' understanding that the polymeric binder serves to substantially prevent adhesive contact between the pigment component and the substrate.

Preferably, in use (i.e. when the paint compositions of the present invention are applied to a substrate), the polymeric binder forms a protective intermediate coating layer between the pigment component and the substrate. Preferably, said protective intermediate coating layer is no more than 5 µm, preferably no more than 2 µm, preferably no more than 1 µm in thickness.

Preferably, the polymeric binder encapsulates the pigment component, particularly in use (i.e. when the paint compositions of the present invention are applied to a substrate).

The adhesive force between the paint composition and the surface to which it is applied is preferably adsorption and/or mechanical adhesion. It is the inventors' understanding that the adhesive force between the paint composition and the surface to which it is applied does not involve the formation of chemical bonds.

The adhesive force between the polymeric binder and the substrate to which the paint composition is applied is nevertheless sufficiently labile that it can be broken by a suitable removal agent, as described further below.

The paint compositions of the present invention exhibit excellent cohesive and adhesive strength when applied to a substrate and hence good durability, whilst also being removable without damage or staining to the substrate.

Thus, it will be appreciated from the description herein that a paint composition according to the first aspect of the invention is a removable paint composition. In particular, it will be appreciated from the description herein that the paint compositions of the invention are weather-resistant (particularly to sunshine, rain, snow and hail) temporary paint compositions.

The paint compositions of the present invention preferably do not contain cellulosic material, i.e. cellulose or cellulose derivatives (particularly cellulose carboxylate derivatives). The paint compositions of the present invention preferably do not contain a copolyamide. The paint compositions of the present invention preferably do not contain an elastomeric resin; in particular it is preferred that the polymeric component or polymeric binder is not, or does not comprise an elastomeric resin (by which is meant a polymer having a glass transition temperature (in the case of amorphous polymers) or a melting temperature (in the case of an at least partially crystalline polymer) below 0° C.).

Paint Composition: Organic Solvent Component

The organic solvent component comprises or consists of one or more organic solvent(s). The organic solvent(s) are suitably selected from organic solvent(s) conventionally used in the formulation of paints. Preferably, the organic solvent is a "volatile organic solvent" which, as used herein, is an organic solvent capable of vaporizing at atmospheric pressure and a temperature in a range from about 1° C. to about 60° C.

Exemplary organic solvents include alcohols, esters and ester alcohols (e.g. isopropyl acetate; 2-methoxy-1-methylethyl acetate; n-butyl acetate; isobutyl acetate; n-propyl acetate; primary amyl acetate mixed isomers); ketones (e.g. acetone, methyl ethyl ketone, methyl propyl ketone, methyl isobutyl ketone, and diisobutyl ketone), glycol ethers (such as ethylene and propylene glycol ethers), polyethylene glycols (suitably having a weight average molecular weight (Mw) of no more than 1000), aliphatic and aromatic hydrocarbons and naphthas (such as toluene and xylene), petroleum and wood distillates, turpentine, pine oil, and the like, and mixtures thereof. The organic solvent component comprises a single organic solvent or a mixture of organic solvents.

Preferred organic solvents are selected from alcohols and ketones, and particularly from alcohols. The alcohols may be monohydric or polyhydric alcohols. Preferred polyhydric alcohols are selected from glycols (e.g. ethylene glycol and diethylene glycol). Preferably the alcohol is selected from monohydric alcohols.

The alcohols may be aliphatic or cycloaliphatic alcohols (suitably a $C_{5-7}$ alcohol, preferably a $C_6$ cycloaliphatic alcohol), and are preferably aliphatic alcohols (preferably $C_{1-10}$ alcohols, preferably $C_{2-6}$ alcohols).

Preferably the alcohol is a monohydric aliphatic alcohol.

Suitable alcohols are selected from methanol, ethanol, n-propyl alcohol, isopropyl alcohol, n-butyl alcohol, isobutyl alcohol, tert-butyl alcohol, 2-methyl butanol, isoamyl alcohol and other primary amyl alcohol isomers, n-pentanol, 2-ethylhexanol, 4-hydroxy-2,6,8-trimethylnonane and diisobutyl carbinol. Preferably, said alcohol is selected from ethanol and isopropyl alcohol, preferably ethanol. In a particularly preferred embodiment, the alcohol is denatured ethanol, for instance comprising ethanol and less than about 1 wt % tert-butyl alcohol and denatonium benzoate or denatonium saccharide.

In a preferred embodiment, the organic solvent component comprises one or more organic solvent(s) and further comprises water. In this embodiment, it is preferred that said organic solvent component comprises water in amounts of no more than about 60%, preferably no more than about 50% by weight of the organic solvent component, for instance such that the weight ratio of organic solvent to water is from about 40:60 to about 60:40, and preferably about 50:50.

In a more preferred embodiment, the organic solvent component comprises said one or more organic solvent(s) in an amount of at least 90, preferably at least 95, preferably at least 98, preferably at least 99%, and preferably at least 99.9% by weight of the organic solvent component.

Preferably, the organic solvent(s) exhibit a standard enthalpy change of vaporization which is greater than about 20 kJ/mol, preferably greater than about 25 kJ/mol, preferably greater than about 30 kJ/mol, for instance greater than about 35 kJ/mol. Preferably, the standard enthalpy change of vaporization is no more than about 50 kJ/mol, preferably no more than about 45 kJ/mol and typically no more than about 40 kJ/mol. As used herein, the standard enthalpy change of vaporization is taken as the value at atmospheric pressure at 298K.

Preferably, the organic solvent(s) and the polymeric binder are inter-molecularly associated in the paint composition, i.e. prior to application of the paint composition to a substrate. Thus, at least some (and preferably substantially all) of the molecules of the organic solvent are associated with at least some of the molecules of the polymeric binder. The inter-molecular association between the organic solvent(s) and the polymeric binder may be or comprise hydrogen bonding interactions or other inter-molecular attractive forces such as non-polar and dipole-dipole interactions. Such inter-molecular association is described hereinbelow principally with reference to hydrogen bonding but it will be appreciated that the references to hydrogen bonding are applicable also to other inter-molecular attractive forces such as non-polar and dipole-dipole interactions.

Thus, preferably, the organic solvent(s) have one or more functional groups which are capable of forming hydrogen bonds, preferably hydrogen bonds to the polymeric binder. Preferably, said functional groups are selected from oxygen-containing groups, and preferably from hydroxyl (—OH), carboxyl (—C=O) groups (particularly ketones), and carboxylic acid groups (—COOH), and preferably from hydroxyl and carboxyl groups, and preferably from hydroxyl groups. The organic solvent component may comprise one or more of such compounds. Where the organic solvent component comprises a plurality of organic solvents, said hydrogen bond-forming compound(s) preferably makes up at least 90, preferably at least 95, preferably at least 98, preferably at least 99% by weight of the organic solvent component.

Preferably, the paint composition of the present invention comprises one or more organic solvent(s) and a polymeric binder such that the molar ratio of hydrogen bonding functional groups on the organic solvent(s) to the hydrogen bonding functional groups on the polymeric binder is no greater than 1.0, and preferably less than 1.0. Thus, it is preferred that there is an excess of hydrogen-bonding functional groups on the polymeric binder relative to the hydrogen-bonding functional groups on the organic solvent(s).

Paint Composition: Polymeric Component

The polymeric component in the paint composition of the present invention is or comprises or consists essentially of a polymeric binder which allows secure and reversible adhesion of the composition to the substrate, and provides a durable finished coating. It will be appreciated that the polymeric binder is film-forming. Thus, the polymeric binder forms a film on application to the substrate.

The polymeric binder may be a single type of polymer or a mixture of two or more different types of polymers.

Preferably the polymeric binder exhibits functional groups which are capable of forming hydrogen bonds, preferably wherein the functional groups are capable of forming hydrogen bonds to the organic solvent and/or propellant. Preferably, said functional groups are selected from oxygen-containing groups, and preferably from hydroxyl, carboxyl groups and carboxylic acid groups (or salts thereof, preferably metal salts). The polymeric binder may exhibit one or more type(s) of said functional groups, and may contain one or more type(s) of polymer comprising such functional groups. Where the polymeric binder comprises a plurality of different type(s) of polymer, said hydrogen bond-forming polymer(s) preferably make up at least 90, preferably at least 95, preferably at least 98, preferably at least 99% by weight of the polymeric component.

Preferably the polymeric binder exhibits chemical bonds which are hydrolysable by a base (preferably by a base in aqueous solution, preferably by a weak base, typically by an organic base).

The polymeric binder is preferably thermoplastic. Preferably the polymeric binder is water-soluble or water-dispersible.

The polymeric binder may be a homopolymer in which the repeating units are derived only from a single monomer, or the polymeric binder may be a copolymer comprising repeating units derived from two or more co-monomers. Preferably, the polymeric binder is a copolymer. As used herein, the term "co-polymer" refers to polymers having 2 or more types of repeating units, for instance, 2, 3 or 4 types of repeating units, and typically the term is used to refer to polymers having 2 types of repeating units.

Preferably, the polymeric binder comprises repeating units derived from one or more monomer(s) selected from mono-olefinically unsaturated compounds which are polymerisable by free-radical polymerisation. Preferably, the polymeric binder comprises at least two types of monomers, and typically two or three types of monomers.

Preferably, the polymeric binder comprises at least one (and typically one) type of monomer selected from mono-olefinically unsaturated carboxylic acids, such as acrylic acid, methacrylic acid or crotonic acid.

Additionally or alternatively, the polymeric binder preferably comprises at least one type of monomer selected from mono-olefinically unsaturated carboxylic acid esters and vinyl esters of carboxylic acids. One or more mono-olefinically unsaturated carboxylic acid esters may be present in the polymeric binder. One or more vinyl esters of carboxylic acids may be, and preferably is, present in the polymeric binder. Preferred mono-olefinically unsaturated carboxylic acid esters suitably contain up to 15 carbon atoms, typically up to 12 carbon atoms, typically up to 8 carbon atoms, typically up to 6 carbon atoms, for example: methyl, ethyl, n-butyl or t-butyl methacrylate; methyl, ethyl, n-butyl or t-butyl acrylate. Preferred vinyl esters of carboxylic acids suitably contain up to 15 carbon atoms, and are preferably selected from vinyl esters of $C_{1-12}$ alkanoic acids, particularly vinyl acetate, vinyl propionate and vinyl neodecanoate, and particularly vinyl acetate.

Further examples of comonomer(s) present in the polymeric binder are provided in the description hereinbelow.

Preferably, the polymeric binder has a weight-average molecular weight ($M_W$) of from about 500 to about 5,000,000.

Molecular weight determination herein is preferably conducted on a Hewlett-Packard 1050 Series HPLC system equipped with two GPC Ultrastyragel columns, $10^3$ and $10^4$ Å (5 μm mixed, 300 mm×19 mm, Waters Millipore Corporation, Milford, Mass., USA) and THF as mobile phase. The molecular weight is calculated by comparison with the retention times of polystyrene standards.

Preferred categories of polymeric binder are described hereinbelow.

In a first preferred embodiment, the polymeric binder comprises repeating units derived from monomers comprising one or more group(s) selected or derived from carboxylic acid, sulphonic acid and phosphoric acid groups, and preferably from carboxylic acid groups. Such polymers may be referred to as "anionic polymers".

Preferably, a monomer of the polymeric binder of the first embodiment is an unsaturated mono- or di-carboxylic acid of formula (I):

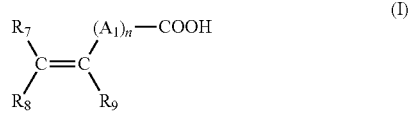

wherein:
n is an integer from 0 to 10;
$A_1$ is a methylene group, optionally linked to the carbon atom of the unsaturated group (i.e. the C=C group) or to the neighbouring methylene group when n is greater than 1 by a hetero-atom (preferably wherein the heteroatom is selected from oxygen and sulphur);
$R_7$ is selected from H, —COOH, —CH$_2$—COOH, phenyl and benzyl;
$R_8$ is selected from H, lower alkyl, —COOH and —CH$_2$—COOH; and
$R_9$ is selected from H, lower alkyl, —CH$_2$—COOH, phenyl and benzyl.

In formula (I), the term "lower alkyl" refers to a $C_{1-6}$ hydrocarbyl group and preferably a $C_{1-4}$ hydrocarbyl group, for example, methyl, ethyl, n-propyl, i-propyl, and n-butyl.

In the compounds of formula (I), preferably only one of $R_7$, $R_8$ and $R_9$ may be, is or comprises a —COOH group.

Preferably, n=0 or 1 and preferably 0. Where n is from 1 to 10, preferably the group $A_1$ is linked directly to the unsaturated group or to a neighbouring methylene group, i.e. without an intervening hetero-atom.

Where the polymeric binder is a homopolymer or copolymer comprising a repeating unit derived from a monomer comprising a sulphonic acid group, the monomer is preferably selected from vinylsulphonic, styrenesulphonic, naphthalenesulphonic, and acrylamidoalkylsulphonic acids and salts thereof. For example, these polymers may be chosen from:
(i) Polymers of vinylsulphonic acid salts having an average molecular weight ($M_W$) ranging from 1000 to 100 000, and copolymers thereof with an unsaturated comonomer, such as acrylic or methacrylic acids and esters thereof, and acrylamide and derivatives thereof, vinylethers, and vinylpyrrolidone;
(ii) Salts of polystyrenesulphonic acid such as the sodium salts, for instance as described in FR 2 198 719; and
(iii) Salts of polyacrylamidesulphonic acid such as those mentioned in U.S. Pat. No. 4,128,631, and, for example, polyacrylamidoethylpropanesulphonic acid.

In the polymeric binder of the first embodiment, one or more additional comonomer(s) is/are typically present. Additional comonomers preferably include mono-olefinically unsaturated carboxylic acid esters and/or vinyl esters of carboxylic acids. Preferred mono-olefinically unsaturated carboxylic acid esters suitably contain up to 15 carbon atoms, typically up to 12 carbon atoms, typically up to 8 carbon atoms, typically up to 6 carbon atoms, for example: methyl, ethyl, n-butyl or t-butyl methacrylate; methyl, ethyl, n-butyl or t-butyl acrylate. Preferred vinyl esters of carboxylic acids suitably contain up to 15 carbon atoms, and are preferably selected from vinyl esters of $C_{1-12}$ alkanoic acids, particularly vinyl acetate, vinyl propionate and vinyl neodecanoate, and particularly vinyl acetate. Further examples of the additional comonomer(s) are provided below.

In a second preferred embodiment, the polymeric binder is a polymer which is selected from the homopolymers and copolymers of N-vinylpyrrolidone (preferably wherein vinyl acetate is the comonomer). The average molecular weight ($M_W$) of such polymers is preferably at least about 200,000, preferably at least about 400,000, and typically no more than about 800,000. Where the polymer is a copolymer of N-vinylpyrrolidone and vinyl acetate, the copolymer preferably comprises from about 20 to about 50 wt % N-vinylpyrrolidone and about 80 to about 50 wt % vinyl acetate, preferably, from about 25 to about 40 wt % N-vinylpyrrolidone and from about 75 to about 60 wt % vinyl acetate.

In a third preferred embodiment, the polymeric binder comprises a polymer which is selected from non-hydrolyzed or partially hydrolyzed polyvinylacetates Preferably, the polymeric binder is selected from:
(A): Homopolymers and copolymers of acrylic and methacrylic acid and salts thereof, copolymers of acrylic acid and acrylamide and salts thereof, and sodium salts of polyhydroxycarboxylic acids.
(B): Copolymers of acrylic and/or methacrylic acid with at least one mono-ethylenic monomer, for instance selected from ethylene, styrene, vinyl esters, esters of acrylic acid, and esters of methacrylic acid, optionally grafted with at least one polyalkylene glycol (such as polyethylene glycol), and optionally crosslinked, (as described, for example, in GB-922,457 and DE-2,330,956), and may comprise in their chain at least one unit chosen from optionally N-alkylated and hydroxyalkylated acrylamide units, as described, for example, in LU-75370 and LU-75371. Examples include copolymers of acrylic acid and $C_{1-4}$ alkyl methacrylate. Further examples include copolymers of methacrylic acid and $C_{1-4}$ alkyl acrylate, such as ethyl acrylate. Further examples include copolymers of acrylates and N-vinylpyrrolidone. Further examples include copolymers of N-vinylpyrrolidone, acrylic acid and $C_{1-20}$ alkyl (for example lauryl) methacrylate. Further examples are methacrylic acid/ethyl acrylate/tert-butyl acrylate terpolymers. Further examples are methacrylic acid/acrylic acid/ethyl acrylate/methyl methacrylate copolymers, preferably in the form of an aqueous dispersion.
(C): Crotonic acid copolymers, such as those copolymers comprising in their chain at least one unit selected from vinyl esters of $C_{1-12}$ alkanoic acids, particularly vinyl acetate, vinyl propionate and vinyl neodecanoate, and particularly vinyl acetate and/or vinyl propionate units; and optionally further comprising at least one first additional unit, for example selected from allyl esters, methallyl esters, vinyl ethers and vinyl esters of linear or branched, saturated carboxylic acids comprising at least one long hydrocarbon-based chain (e.g. chains comprising at least 5 carbon atoms), wherein said polymers are optionally grafted or crosslinked; and optionally wherein said crotonic acid copolymers further comprise at least one second additional unit chosen from vinyl, allyl, and methallyl esters of an α- or β-cyclic carboxylic acid. Such polymers are described in French Patent Nos. 1 222 944, 1 580 545, 2 265 782, 2 265 781, 1 564 110 and 2 439 798.

(D): Copolymers of mono-unsaturated $C_{4-8}$ carboxylic acids or anhydrides, selected from copolymers comprising (i) at least one first unit chosen from maleic, fumaric, itaconic acids, and anhydrides and (ii) at least one second unit chosen from vinyl esters, vinyl ethers, vinyl halides, phenylvinyl derivatives, acrylic acid and esters thereof, the anhydride functions of these polymers being optionally mono-esterified or mono-amidated. Such polymers are described, for example, in U.S. Pat. Nos. 2,047,398, 2,723,248 and 2,102,113, and GB-839 805. Examples include copolymers comprising (i) at least one first unit chosen from maleic, citraconic, and itaconic anhydride units and (ii) at least one second unit chosen from allyl and methallyl esters optionally comprising at least one group chosen from acrylamide, methacrylamide, α-olefin, acrylic acid ester, methacrylic acid ester, acrylic acid, methacrylic acid, and N-vinylpyrrolidone groups in their chain, wherein the anhydride functions of these polymers are optionally mono-esterified or mono-amidated. Such polymers are described in French Patent Nos. 2 350 384 and 2 357 241.

(E): Polyacrylamides comprising at least one carboxylate group.

Preferred examples of the polymeric binder include:

methacrylic acid/ethyl acrylate copolymers, suitably wherein the ratio of the comonomers is from about 40:60 to about 60:40 and preferably about 50:50, and preferably having an average molecular weight ($M_W$) of about 250,000;

methacrylic acid/ethyl acrylate/tert-butyl acrylate terpolymers, suitably wherein the copolymer comprises about 60-70 wt % (preferably about 67 wt %) t-butyl acrylate and about 20-25 wt % (preferably about 23 wt %) methacrylic acid and about 5-15 wt % (preferably about 10 wt %) ethyl acrylate;

acrylic acid copolymers, such as acrylic acid/ethyl acrylate/N-tert-butylacrylamide terpolymers;

methacrylic acid/methyl methacrylate copolymers;

methacrylic acid/acrylic acid/ethyl acrylate/methyl methacrylate copolymers, preferably in the form of an aqueous dispersion;

vinyl acetate/crotonic acid copolymers, suitably wherein the copolymer comprises about 80-95 wt % (preferably about 90 wt %) vinyl acetate and about 5-15 wt % (preferably about 10 wt %) crotonic acid;

other copolymers derived from crotonic acid, such as the vinyl acetate/crotonic acid/vinyl propionate copolymers, or such as the vinyl acetate/vinyl tert-butylbenzoate/crotonic acid terpolymers and the crotonic acid/vinyl acetate/vinyl neodecanoate terpolymers;

vinyl acetate/crotonic acid copolymers grafted with polyethylene glycol;

polymers derived from maleic, fumaric or itaconic acids or anhydrides with vinyl esters, vinyl ethers, vinyl halides, phenylvinyl derivatives, acrylic acid and esters thereof, such as the methyl vinyl ether/monoesterified maleic anhydride copolymers; and vinyl pyrrolidone/acrylic acid/lauryl methacrylate terpolymers.

Particularly preferred polymeric binders are selected from:

vinyl acetate/crotonic acid copolymers, suitably wherein the copolymer comprises about 80-95 wt % (preferably about 90 wt %) vinyl acetate and about 5-15 wt % (preferably about 10 wt %) crotonic acid; and crotonic acid/vinyl acetate/vinyl neodecanoate terpolymers, preferably having an average molecular weight ($M_W$) of from about 90,000 to about 110,000.

Where the polymeric binder is a vinyl acetate/crotonic acid copolymer, the propellant is preferably selected from dimethyl ether (DME). Where the polymeric binder is a crotonic acid/vinyl acetate/vinyl neodecanoate terpolymer, the propellant may be selected from DME, or propane and/or n-butane, and blends thereof.

Preferably, the polymeric binder is selected from the polymeric binders, particularly the anionic polymers, disclosed above.

In further embodiments, the polymeric binder may be selected from the so-called cationic, amphoteric and nonionic polymers disclosed in US-2005/0158265-A.

Said cationic polymers are suitably selected from polymers comprising at least one group chosen from primary, secondary, tertiary and quaternary amine groups which are part of the polymer chain or directly connected thereto, and which have a weight-average molecular weight ($M_W$) from about 500 to about 5 000 000, and typically from about 1000 to about 3,000,000. Examples of the cationic polymers include the following:

Family (1): Homopolymers or copolymers of acrylic or methacrylic esters or amides, comprising at least one amino functional group, wherein the homopolymers or copolymers comprise at least one of unit of a residue selected from —$CH_2$—$C(R_3)(R_0)$—, wherein $R_0$ is selected from —O(=O)—O-A-$NR_1R_2$, —C(=O)—O-A-$N^+R_4R_5R_6[X^-]$, —C(=O)—NH-A-$N^+R_4R_5R_6[X^-]$, $R_1$ and $R_2$, which may be identical or different, are independently selected from H and $C_{1-6}$ alkyl;

$R_3$, which may be identical or different, is selected from H and methyl;

A is selected from linear and branched $C_{1-6}$ alkyl groups and $C_{1-4}$ hydroxyalkyl groups;

$R_4$, $R_5$ and $R_6$, which may be identical or different, are independently selected from $C_{1-18}$ alkyl groups and benzyl; and X is chosen from a methosulphate anion and halides, such as chloride and bromide.

Copolymers of Family (1) optionally comprise at least one unit derived from comonomers which can be chosen from acrylamides, methacrylamides, diacetone acrylamides, acrylamides, and methacrylamides substituted on the nitrogen with at least one group chosen from lower ($C_{1-4}$) alkyl groups, groups derived from acrylic or methacrylic acids and esters thereof, vinyllactams, such as vinylpyrrolidone and vinylcaprolactam, and vinyl esters. Examples of the copolymers of family (1) include:

(i) copolymers of acrylamide and of dimethylaminoethyl methacrylate, quaternized with dimethyl sulphate or with a dimethyl halide;

(ii) copolymers of acrylamide and of methacryloyloxyethyltrimethylammonium chloride described in EP-A-080976;

(iii) copolymers of acrylamide and of methacryloyloxyethyltrimethylammonium methosulphate;

(iv) quaternized or nonquaternized vinylpyrrolidone/dialkylaminoalkyl acrylate or methacrylate copolymers, as described in French Patent Nos. 2 077 143 and 2 393 573;

(v) polymers comprising at least one fatty chain and at least one vinylpyrrolidone unit;

(vi) dimethylaminoethyl methacrylate/vinylcaprolactam/vinylpyrrolidone terpolymers; and (vii) quaternized vinylpyrrolidone/dimethylaminopropyl methacrylamide copolymers.

Family (2): cationic polysaccharides, for example, comprising quaternary ammonium, such as those described in U.S. Pat. Nos. 3,589,578 and 4,031,307, for example, guar gums comprising at least one trialkylammonium cationic group.

Family (3): quaternized copolymers of vinylpyrrolidone and vinylimidazole.

Family (4): chitosans or salts thereof; the salts which can be used may, for example, be chosen from acetate, lactate, glutamate, gluconate, and pyrrolidonecarboxylate of chitosan.

Family (5): cationic cellulose derivatives such as the copolymers of cellulose or of cellulose derivatives grafted with a water-soluble quaternary ammonium monomer, and described, for example, in U.S. Pat. No. 4,131,576, such as hydroxyalkylcelluloses, for example, chosen from hydroxymethyl-, hydroxyethyl-, and hydroxypropyl celluloses grafted, for example, with at least one salt chosen from methacryloyloxyethyltrimethylammonium, methacrylamidopropyltrimethylammonium, and dimethyldiallylammonium salts.

Amphoteric polymers are selected from polymers comprising units B and C distributed randomly in the polymer chain, wherein B is chosen from units derived from a monomer comprising at least one basic nitrogen atom and C is chosen from units derived from an acid monomer comprising at least one group chosen from carboxylic and sulphonic groups, or B and C, which can be identical or different, can be chosen from groups derived from zwitterionic monomers of carboxybetaines or sulphobetaines. B and C, which can be identical or different, can also be chosen from cationic polymer chains comprising at least one group chosen from primary, secondary, tertiary, and quaternary amine groups wherein at least one of the amine groups bears a carboxylic or sulphonic group linked via a hydrocarbon-based group, or B and C can form part of a chain of a polymer comprising ethylene-α,β-dicarboxylic units, wherein one of the carboxylic groups has been made to react with a polyamine comprising at least one group chosen from primary and secondary amine groups.

The amphoteric polymers may be chosen from the following families of polymers:

Family (1): copolymers comprising acidic vinyl units and basic vinyl units, such as those resulting from the copolymerization of a monomer derived from a vinyl compound bearing a carboxylic group, for example, acrylic acid, methacrylic acid, maleic acid, or alpha-chloroacrylic acid, and a basic monomer derived from a substituted vinyl compound comprising at least one basic atom, such as dialkylaminoalkyl methacrylate and acrylate and dialkylaminoalkylmethacrylamide and -acrylamide. Such compounds are described in U.S. Pat. No. 3,836,537.

Family (2): polymers comprising units derived from:
a) at least one monomer chosen from acrylamides and methacrylamides substituted on the nitrogen atom with an alkyl group,
b) at least one acidic comonomer comprising at least one reactive carboxylic group, and
c) at least one basic comonomer, for example, chosen from acrylic and methacrylic acid esters comprising at least one substituent chosen from primary, secondary, tertiary and quaternary amine substituents, and the product of quaternization of dimethylaminoethyl methacrylate with dimethyl or diethyl sulphate.

Said N-substituted acrylamides or methacrylamides may be chosen from compounds wherein the alkyl groups comprise from 2 to 12 carbon atoms, for example, N-ethylacrylamide, N-tert-butylacrylamide, N-tert-octylacrylamide, N-octylacrylamide, N-decylacrylamide, N-dodecylacrylamide, and corresponding meth-acrylamides.

Said acidic comonomers may be chosen from acrylic acid, methacrylic acid, crotonic acid, itaconic acid, maleic acid, fumaric acid, and alkyl monoesters, comprising from 1 to 4 carbon atoms, of maleic acids, fumaric acids, or anhydrides.

Said basic comonomers may be chosen from aminoethyl, butylaminoethyl, N,N'-dimethylaminoethyl, and N-tert-butylaminoethyl methacrylates.

A suitable copolymer is octylacrylamide/acrylates/butylaminoethyl methacrylate copolymer.

Family (3): crosslinked and acylated polyamino amides partially or totally derived from polyamino amides of general formula: —[CO—$R_{10}$—CO—Z]— wherein:

$R_{10}$ is chosen from divalent groups derived from a saturated dicarboxylic acid, mono- or di-carboxylic aliphatic acids comprising at least one ethylenic double bond, esters of a $C_{1-6}$ alkanol of these acids, and groups derived from the addition of at least one of the acids to amines chosen from bis(primary) and bis-(secondary) amines, and Z is chosen from groups derived from a bis(primary), mono- or bis(secondary) polyalkylene-polyamines and may, for example, represent:
(a) in proportions ranging from 60 to 100 mol %, the group —NH—[$(CH_2)_x$—NH]$_p$— (formula II), wherein $x=2$ and $p=2$ or 3, or $x=3$ and $p=2$, this group being derived from a compound chosen from diethylenetriamine, triethylenetetraamine and dipropylenetriamine;
(b) in proportions ranging from 0 to 40 mol %, the group of formula (II) above, wherein $x=2$ and $p=1$ and which is derived from a compound chosen from ethylenediamine and piperazine;
(c) in proportions ranging from 0 to 20 mol %, the group —NH—$(CH_2)_6$—NH— derived from hexamethylenediamine, these polyamino amides can be crosslinked by reaction addition of a difunctional crosslinking agent chosen from epihalohydrins, diepoxides, dianhydrides, and bis-unsaturated derivatives, using from 0.025 to 0.35 mol of crosslinking agent per amine group of the polyamino amide, and acylated by the action of acrylic acid, chloroacetic acid, an alkane sultone, or salts thereof.

Said saturated dicarboxylic acids may, for example, be chosen from acids comprising from 6 to 10 carbon atoms, such as adipic acid, 2,2,4-trimethyladipic acid, 2,4,4-trimethyladipic acid, terephthalic acid, and acids comprising at least one ethylenic double bond, such as acrylic acid, methacrylic acid, and itaconic acid.

The alkane sultones used in the acylation may, for example, be chosen from propane sultone and butane sultone, the salts of the acylating agents may, for example, be chosen from sodium and potassium salts.

Family (4): polymers comprising zwitterionic units of formula:

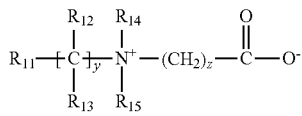

wherein:

$R_{11}$ is chosen from polymerizable unsaturated groups, for example, acrylate, methacrylate, acrylamide, and methacrylamide groups;

y and z, which may be identical or different, are each integers ranging from 1 to 3;

$R_{12}$ and $R_{13}$, which may be identical or different, are each chosen from H and methyl, ethyl and propyl groups; and $R_{14}$ and $R_{15}$, which may be identical or different, are each chosen from a hydrogen atom and alkyl groups chosen such that the sum of the carbon atoms in $R_{14}$ and $R_{15}$ does not exceed 10.

The polymers comprising such units can further comprise at least one additional unit derived from non-zwitterionic monomers, for example, chosen from dimethylaminoethyl acrylates, diethylaminoethyl acrylates and methacrylates; alkyl acrylates and methacrylates; acrylamides and methacrylamides; and vinyl acetate. By way of example, mention may be made of methyl methacrylate/methyl dimethylcarboxymethylammonioethylmethacrylate copolymers.

Family (5): polymers derived from chitosan comprising monomer units corresponding to the following formulae:

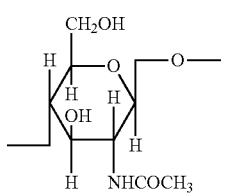 (D)

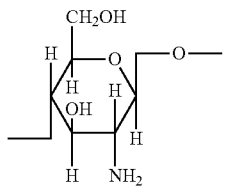 (E)

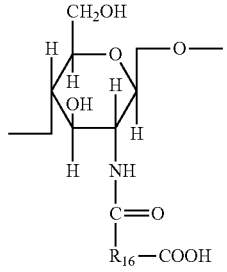 (F)

wherein the unit (D) is present in proportions ranging from 0 to 30%, the unit (E) is present in proportions ranging from 5 to 50% and the unit (F) is present in proportions ranging from 30 to 90%, it being understood that, in the unit (F), $R_{16}$ is chosen from groups of formula:

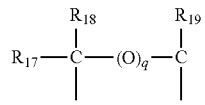

wherein q=0 or 1, and if q=0, $R_{17}$, $R_{18}$ and $R_{19}$, which may be identical or different, are each chosen from H; methyl, hydroxyl, acetoxy and amino residues; monoalkylamine residues; and dialkylamine residues, optionally interrupted by at least one nitrogen atom and optionally substituted with at least one group chosen from amine, hydroxyl, carboxyl, alkylthio and sulphonic groups, and alkylthio residues wherein the alkyl group bears at least one amino residue, wherein at least one of the groups chosen from $R_{17}$, $R_{18}$ and $R_{19}$ are, in this case, H; or if q=1, $R_{17}$, $R_{18}$ and $R_{19}$, which may be identical or different, are each chosen from H and salts formed by these compounds with bases or acids.

Family (6): polymers corresponding to formula:

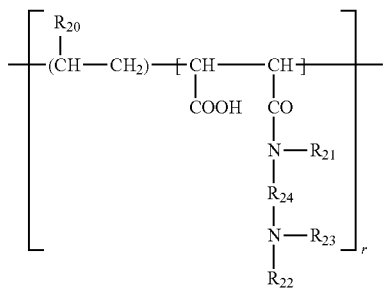

as described in French Patent No. 1 400 366, wherein:

$R_{20}$ is chosen from H, $CH_3O$, $CH_3CH_2O$, and phenyl groups;

$R_{21}$ is chosen from H and $C_{1-6}$ alkyl groups, such as methyl and ethyl groups;

$R_{22}$ is chosen from H and $C_{1-6}$ alkyl groups, such as methyl and ethyl groups;

$R_{23}$ is chosen from $C_{1-6}$ alkyl groups, such as methyl and ethyl groups, and groups corresponding to the formula: $-R_{24}-N(R_{22})_2$, wherein $R_{24}$ is chosen from $-CH_2-CH_2-$, $-CH_2-CH_2-CH_2-$, and $-CH_2-CH(CH_3)-$ groups and $R_{22}$ has the meanings mentioned above; and r is an integer greater or equal to 1.

Family (7): polymers derived from the N-carboxyalkylation of chitosan, such as N-carboxymethylchitosan or N-carboxybutylchitosan.

Family (8): amphoteric polymers of the type -D-X-D-X chosen from:

a) polymers obtained by the action of chloroacetic acid or sodium chloroacetate on compounds comprising at least one unit of formula -D-X-D-X-D- wherein D is chosen from group:

and X is chosen from groups E and E' wherein E and E', which may be identical or different, are each chosen from divalent alkylene groups comprising at least one chain chosen from straight and branched chains comprising up to 7 carbon atoms in the main chain, wherein the divalent alkylene radicals are optionally substituted with at least one hydroxyl group, and wherein E and E' may additionally comprise at least one entity chosen from oxygen, nitrogen, and sulphur atoms and 1 to 3 aromatic and heterocyclic rings; wherein the oxygen, nitrogen, and sulphur atoms may be present in the form of at least one group chosen from ether, thioether, sulphoxide, sulphone, sulphonium, alkylamine, alkenylamine, hydroxyl, benzylamine, amine oxide, quaternary amine, amide, imide, alcohol, ester, and urethane groups; and b) polymers of formula -D-X-D-X— wherein D is chosen from group:

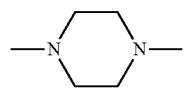

and X is chosen from the groups E and E' and wherein at least one X is chosen from E'; wherein E has the meaning given above and E' is a divalent group chosen from divalent alkylene groups comprising at least one chain chosen from straight and branched chains comprising up to 7 carbon atoms in the main chain, wherein the divalent alkylene groups are optionally substituted with at least one hydroxyl group and comprising at least one nitrogen atom, wherein the nitrogen atom is substituted with an alkyl chain that is optionally interrupted by at least one oxygen atom, wherein the alkyl chain comprises at least one functional group chosen from carboxyl functional groups and hydroxyl functional groups, betainized by reaction with at least one reactant chosen from chloroacetic acid and sodium chloroacetate.

Family (9): $(C_{1-5})$alkyl vinyl ether/maleic anhydride copolymers partially modified by semi-amidation with an N,N-dialkylaminoalkylamine such as N,N-dimethylaminopropylamine, or by semi-esterification with an N,N-dialkylaminoalkanol. These copolymers may also comprise other vinyl comonomers such as vinylcaprolactam.

Of the amphoteric polymers, polymers of Family (3) being selected from octylacrylamide/acrylates/butylaminoethyl methacrylate copolymers, and polymers of Family (4) being methyl methacrylate/methyl dimethylcarboxymethylammonioethylmethacrylate copolymers, are of particular interest.

Non-ionic polymers may be chosen, for example, from:
(i) polyalkyloxazolines;
(ii) vinyl acetate homopolymers;
(iii) vinyl acetate copolymers, such as copolymers of vinyl acetate and of acrylic ester, copolymers of vinyl acetate and of ethylene, and copolymers of vinyl acetate and of maleic ester, for example, of dibutyl maleate;
(iii) homopolymers and copolymers of acrylic esters, for example, copolymers of alkyl acrylates and of alkyl methacrylates;
(iv) copolymers of acrylonitrile and of a nonionic monomer chosen, for example, from butadiene and alkyl(meth)acrylates;
(v) styrene homopolymers;
(vi) styrene copolymers, for example, copolymers of styrene and of alkyl(meth)acrylate;
copolymers of styrene, of alkyl methacrylate and of alkyl acrylate; copolymers of styrene and of butadiene; and copolymers of styrene, of butadiene, and of vinylpyridine;
(vii) polyamides;
(viii) vinyllactam homopolymers different from the vinylpyrrolidone homopolymers; and
(ix) vinyllactam copolymers, such as a poly(vinylpyrrolidone/vinyllactam) copolymer; poly-(vinylpyrrolidone/vinyl acetate) copolymers; and poly(vinylpyrrolidone/vinyl acetate/vinyl propionate)terpolymers.

The alkyl groups in the nonionic polymers mentioned above may, for example, comprise from 1 to 6 carbon atoms.

In a further embodiment, the polymeric binder may be selected from grafted silicone polymers comprising a polysiloxane portion and a portion comprising a nonsilicone organic chain, one of the two portions constituting the main chain of the polymer and the other portion being grafted onto the main chain. Such polymers are described in EP-A-0412704, EP-A-0412707, EP-A-0640105, WO-A-95/00578, EP-A-0582152, WO-A-93/23009 and U.S. Pat. Nos. 4,693,935, 4,723,571, and 4,972,037. Grafted silicone polymers may be selected from amphoteric, anionic and non-ionic polymers, or from anionic and non-ionic fixing polymers. Such polymers may, for example, be chosen from copolymers which can be obtained by free-radical polymerization using the mixture of monomers made up of:
a) from 50 to 90% by weight of tert-butyl acrylate,
b) from 0 to 40% by weight of acrylic acid,
c) from 5 to 40% by weight of a silicone macromer of formula

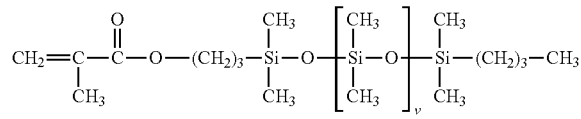

wherein v is a number ranging from 5 to 700, the percentages by weight being calculated relative to the total weight of the monomers.

Other examples of grafted silicone polymers include polydimethylsiloxanes (PDMSs) onto which are grafted, via a thiopropylene-type connecting chain, mixed polymer units of poly((meth)acrylic acid) and of poly(alkyl(meth)acrylate), and polydimethylsiloxanes (PDMSs) onto which are grafted, via a thiopropylene connecting chain, isobutyl poly (meth)acrylate polymer units.

In a further embodiment, the polymeric binder may be selected from functionalized and non-functionalized, silicone and non-silicone, cationic, non-ionic, anionic, and amphoteric polyurethanes. Such polyurethanes may be chosen from those described in EP 0 751 162, EP 0 637 600, EP 0 648 485, FR 2 743 297, EP 0 656 021, WO 94/03510 and EP 0 619 111.

Preferably, the polymeric binder is selected from anionic, cationic and amphoteric materials, preferably from anionic and cationic materials, and preferably from anionic materials.

Paint Composition: Pigment Component

The pigment component provides the paint composition with its colour and opacity. Pigment components are well-known in the art and numerous such pigments are commercially available. Suitable pigment components include dry pigments and pigment dispersions. In a preferred embodiment, the pigment component is a pigment dispersion, i.e. in which the pigment is dispersed in a suitable vehicle or carrier, typically a resin base and/or a solvent. Thus, preferably the pigment component comprises (1) pigment; (2) a resin base; (3) a co-solvent; and optionally (4) one or more functional additives conventional in the art.

The pigment component, particularly a pigment dispersion, preferably comprises the pigment in an amount of from about 10 to about 70 wt % by total weight of the pigment component. The pigment component preferably comprises the resin base in an amount of from about 5 to about 75 wt % by total weight of the pigment component. The remainder of the pigment component is suitably co-solvent (typically in an amount of up to about 10 wt %, preferably up to about 5 wt %, and typically at least about 2 wt %), together with a minor amount (typically less than about 10 wt %) of any optional functional additives conventional in the art.

A dry pigment is typically in powder form. Dry pigments are particularly useful for increasing the opacity of the paint composition. Dry pigments are also useful where the desired pigment is not available in pre-dispersed format.

The pigment component preferably comprises, consists essentially of or consists of the pigment in an amount suitable to provide the paint composition with an amount of pigment of from about 1 to about 55 wt %, by total weight of the paint composition.

Particularly where the pigment component is a pigment dispersion or is not a dry pigment, the paint composition preferably comprises, consists essentially of or consists of:
 (i) said organic solvent component in an amount of from about 55 to about 70% by weight of said composition;
 (ii) said polymeric component in an amount of from about 15 to about 25% by weight of said composition;
 (iii) said pigment component in an amount of from about 8 to about 20% by weight of said composition; and
 (iv) optionally said acid(s) in an amount of from about 0.1 to about 1.0% by weight of said composition.

Where the pigment component is a dry pigment, the paint composition suitably comprises the dry pigment in an amount of from about 1 to about 55% by weight of the composition. As noted above, the dry pigments are particularly useful at high loadings, in order to increase the opacity of the paint composition.

The pigment may be an organic or inorganic pigment or dye. Suitable organic pigments are, for example, described in W. Herbst, K. Hunger, Industrielle Organische Pigmente, $2^{nd}$ revised edition, 1995. Exemplary organic pigments include azo, azomethine, methine, anthraquinone, phthalocyanine, perinone, perylene, diketopyrrolopyrrole, thioindigo, iminoisoindoline, dioxazine, iminoisoindolinone, quinacridone, flavanthrone, indanthrone, anthrapyrimidine and quinophthalone pigments, or a mixture or solid solution thereof; especially an azo, dioxazine, diketopyrrolopyrrole, quinacridone, phthalocyanine, indanthrone or iminoisoindolinone pigment, or a mixture or solid solution thereof. For instance, organic pigments described in the Color Index include C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Yellow 191.1, C.I. Pigment Yellow 74, C.I. Pigment Yellow 83, C.I. Pigment Yellow 13, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, and C.I. Pigment Green 36, or a mixture or solid solution thereof. Suitable inorganic pigments useful in the present pigment compositions are selected from the group consisting of carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, and mixtures thereof. The term "mixtures thereof" also comprises mixtures of inorganic and organic pigments as described, for example in U.S. Pat. No. 5,976, 238. The pigment may be fluorescent or luminescent.

The pigment is typically dispersed in a resin base, normally by milling or grinding the pigment and a resin base together, suitably with a co-solvent and/or optional formulation additives, according to conventional techniques known in the art.

Any suitable resin base conventional in the art of pigment formulation may be used. The resin base is suitably compatible with the binder of the polymeric component of the paint composition of the first aspect of the invention, and/or suitably at least partially soluble in the organic solvent component of the paint composition of the first aspect of the invention. The resin base optionally functions as a co-binder in the paint composition of the first aspect of the invention.

The resin base is suitably a polymeric material. Suitable polymeric materials are typically solid at room temperature, preferably exhibiting a softening temperature of from about 50 to about 100°. Preferred polymeric materials are selected from aldehyde and/or ketone resins, and in particular condensation products of aldehydes and/or ketones, for instance with amines such as urea or with formaldehyde. Examples include condensation products of aliphatic aldehydes such as isobutyraldehyde, for instance with urea; and condensation products of cyclohexanone or methylcyclohexanone, for instance with formaldehyde.

The co-solvent is preferably an organic solvent. Suitable co-solvents are typically selected from the solvents described hereinabove for the organic solvent component. The inventors have found that ethanol or ethanolic solvents and those miscible or soluble or compatible therewith are particularly useful as co-solvents.

Particularly useful commercially available pigment components are the GemSperse® UX Series available from Gemini Dispersions Ltd.

Paint Composition: Acid

The paint composition preferably comprises one or more acid(s). Preferably, the acid(s) are selected from Brønsted-Lowry proton-donating acids, preferably organic acids, preferably carboxylic acids. Preferably, the acid has a pKa value in the range of from about 1.0 to about 6.0, preferably from about 2.0 to about 5.0, preferably from about 3.0 to about 5.0, and preferably from about 4.0 to about 5.0.

The carboxylic acid may be an aromatic or aliphatic carboxylic acid. Preferably, the carboxylic acid has the formula $(R_a)_n Ar$—COOH or $(R_a)_n R$—COOH, wherein:
 Ar is an aromatic group, preferably phenyl;
 R is an alkylene group preferably containing from 2 to 10 carbon atoms;
 n=0, 1 or 2; preferably 0 or 1, and more preferably 0; and
 the or each $R_a$ is independently selected from halo, $C_{1-4}$ alkyl, $C_{1-4}$ alkoxy, nitro, —OH and —COOH.

Preferably, the carboxylic acid is an aromatic carboxylic acid.

Where the carboxylic acid is an aliphatic acid, it is preferably a saturated aliphatic carboxylic acid.

Preferably, said carboxylic acid is a mono-carboxylic acid.

Suitable acids are selected from benzoic acid, hydroxybenzoic acid, methylbenzoic acid, methoxybenzoic acid, terephthalic acid, isophthalic acid and phthalic acid; formic acid, acetic acid, propionic acid, butanoic acid, pentanoic acid, hexanoic acid, trimethylacetic acid, trichloroacetic acid, dichloroacetic acid, chloroacetic acid, bromoacetic acid, oxalic acid, malonic acid, succinic acid, glutaric acid, adipic acid, pimelic acid, suberic acid, azelaic acid, sebacic acid; and the like. Preferably, the acid is benzoic acid.

It will be appreciated that the acid(s) are suitably present in their free form, i.e. not covalently attached to another compound (for instance an organic molecule) or present in a polymer chain.

The inventors have found that said one or more acid(s) are unexpectedly advantageous for increasing the gloss of the paint coating. The inventors have also found that the presence of the acid component assists in the mixing of the polymeric component, pigment component and organic solvent component, particularly to improve the homogeneity of the mixture, and particularly to improve the compatibility between the polymeric component and the pigment component.

Method of Manufacture of the Paint Composition

The paint composition described herein is preferably manufactured by a method comprising the steps of:
(i) optionally mixing the acid(s) into the organic solvent component until the acid(s) is/are fully dispersed or dissolved therein;
(ii) adding the polymeric component to the composition from step (i) with mixing, optionally allowing the mixture to stand after mixing, to provide a homogenous dispersion or solution of the polymeric binder in the organic solvent component, preferably wherein the homogeneous dispersion or solution is clear; and
(iii) adding the pigment component to the composition from step (ii) with mixing until homogenous.

Depending on the delivery format, the paint composition prepared by the above method may be ready to package and/or use, or may require additional steps prior to packaging and use. For instance, where the delivery format is an aerosol, the method may further comprise the step of diluting the paint composition with a solvent prior to packaging (i.e. prior to introducing into a spray-can). The manufacture of an aerosol further comprises combining the paint composition with a propellant, as known in the art.

Delivery Format and Application

The coating compositions may be in any delivery format conventional in the art, particularly by spraying and particularly by aerosols. Other conventional spray equipment may also be used, including air-assisted spraying, airless spraying, electrostatic spraying, and high-volume/low-pressure (HVLP) systems, including XVLP technology (available from Wagner GmbH). The paint can also be applied to a surface via other conventional methods, including brushing, roller-coating, paint pen, pad-coating, flood-coating and dipping. A preferred method of application is spraying. The paint compositions described herein should be suitable for application to the substrate in fluid form, preferably wherein said fluid form is a liquid or an aerosol. Thus, the paint composition is not in solid form, for instance a pre-formed film, when applied to the substrate. As described herein above, film formation occurs on application of the paint composition to the substrate.

The paint composition described herein may be combined with one or more paint-thinner(s), as is conventional in the art, particularly for aerosols and other spray delivery formats, but also for other formats such as paint pens and the like. It will be appreciated by the person skilled in the art that the degree of thinning of the paint composition will depend on the delivery format, the paint composition and the intended use.

An aerosol comprising the paint composition of the present invention further comprises an aerosol propellant and preferably also additional solvent, as is conventional in the art. An aerosol paint composition of the present invention is suitably formed by combining the paint composition of the first aspect of the invention with additional solvents and then aerosolizing the combination with the propellant. The propellant is a liquefiable gas having a vapor pressure sufficient to propel the aerosol paint composition from the container. Preferably, the propellant is selected from the group consisting of ethers, such as dimethyl ether (DME) and diethyl ether; $C_{1-4}$ saturated hydrocarbons, such as methane, ethane, propane, n-butane, and isobutane; hydrofluorocarbons (HFC), such as 1,1,1,2,3,3,3,-heptafluoropropane (HFC-227HFC), difluoromethane (HFC-32), 1,1,1-trifluoroethane (HFC-143a), 1,1,2,2-tetrafluoroethane (HFC-134), 1,1-difluoroethane (HFC-152a) and 1,3,3,3-tetrafluoropropene (HFO-1234ze); and mixtures thereof. More preferably, the propellant is selected from ethers and $C_{1-4}$ saturated hydrocarbons. A preferred ether is DME. Preferred hydrocarbons are selected from n-butane and propane and blends thereof. The amount of the propellant present in the aerosol paint composition is preferably at least 10 wt %, preferably at least 20 wt %, and preferably from about 10 to about 60 wt %, more preferably from about 25 to about 60 wt % of the total weight of the aerosol paint composition. Where DME is the propellant, the preferred amount is from about 40 to about 60 wt %. Where said saturated hydrocarbons are used, the preferred amount is from about 25 to about 40 wt %. The additional solvent in an aerosol comprising the paint composition of the present invention is preferably a volatile organic solvent selected from the organic solvents described in respect of the organic solvent component (i) hereinabove. The amount of additional solvent in the aerosol paint composition is typically at least 10 wt % and preferably no more than about 55 wt %, preferably no more than about 45 wt %, and preferably no more than about 40 wt %, of the aerosol paint composition. The amount of the paint composition of the first aspect of the invention in the aerosol paint composition is preferably from about 20 to about 60 wt %, preferably from about 20 to about 40 wt %, of the aerosol paint composition. The amounts of the propellant, the additional solvent and the paint composition of the first aspect of the invention suitably make up 100 wt % of the aerosol paint composition.

According to a further aspect of the invention, there is provided a paint composition in the form of an aerosol further comprising a propellant and preferably also additional solvent, as described hereinabove.

According to a further aspect of the invention, there is provided an aerosol comprising a paint composition as described herein and further comprising a propellant and preferably also additional solvent, as described hereinabove.

The inventors have also observed excellent results with non-aerosol delivery format, particularly a non-aerosol spray. As noted above, the paint composition is preferably formulated with one or more paint-thinner(s), as is conventional in the art. Such formulations suitably comprise the paint composition in an amount of from about 10 to about 90 wt %, preferably from about 20 to about 80 wt %, typically from about 30 to about 50 wt %, and in one embodiment from about 30 to about 40 wt %, and the paint-thinner(s) in a total amount of from about 10 to about 90 wt %, preferably from about 20 to about 80 wt %, preferably from about 30 to about 70 wt %, typically from about 50 to about 70 wt %, and in one embodiment from about 60 to about 70 wt %. Suitable paint-thinners are preferably selected from the organic solvents described in respect of the organic solvent component (i) hereinabove, for instance alcohols, ketones and hydrocarbons and mixtures thereof. Preferably a mixture of organic solvents is used. A preferred mixture comprises ethanol, acetone and xylene, in approximate proportions of 40:40:20.

The substrate to be coated should be dry, and preferably clean and dust-free.

Preferably, the coating compositions are applied at a temperature in the range of from about 10 to about 30° C., preferably in the range of from about 15 to about 26° C., as is conventional for a solvent-based paint.

The compositions may be applied at a range of wet film thicknesses. Preferably the wet film thickness is such as to provide a dry film thickness of from about 10 to about 500 µm, preferably from about 13 to about 260 µm, and more preferably from about 25 to about 75 µm.

The applied coating is preferably allowed to dry at ambient temperatures in air. Preferred formulations are touch dry in 5-10 minutes, hardened within about 1 hour, and fully dry within up to about 12 hours. Alternatively, the applied coating may be dried by accelerating the drying process, for instance by heating, for example in the range of greater than about 25° to about 65° C.°, and typically for a duration of at least three minutes and typically less than 60 minutes. However, where the applied coating is cured by heating, it is preferred that the temperature remains below the softening point of the polymeric component.

Preferably, the components of the paint composition do not cure or undergo chemical reaction or other chemical transformation, such as chemical bond formation, upon application of the paint composition to a surface. In other words, other than evaporation of the organic solvent(s) (i.e. the volatile organic solvent(s)), the chemical nature or composition of the paint coating applied or disposed on said surface is substantially the same as the chemical nature or composition of the paint composition. In particular, the polymeric binder preferably does not cure or undergo chemical reaction or other chemical transformation upon application of the paint composition to a surface. Preferably also, where said one or more acid(s) are present in the paint composition, it is preferred that said acid(s) do not cure or undergo chemical reaction or other chemical transformation upon application of the paint composition to a surface. Preferably also, where the pigment component comprises a resin base, it is preferred that said resin base does not cure or undergo chemical reaction or other chemical transformation upon application of the paint composition to a surface. Similarly, it is preferred that the pigment itself does not cure or undergo chemical reaction or other chemical transformation upon application of the paint composition to a surface.

The coating compositions are preferably applied to a substrate in a single coat. Further coatings can optionally be applied. Further coatings can, for instance, achieve a glossier finish. However, further coatings tend to result in longer removal times. Further coatings may also reduce the hardness of the coating.

The coating is weather-resistant, including sunshine, rain, snow and hail, providing a durable coating which is substantially equivalent in appearance to a conventional "permanent" coating.

The coating compositions may be applied to a variety of surfaces including metal surfaces (including aluminum, brass, copper, iron, steel, tin and zinc, and other metal or metalloid surfaces including alloys), glass, ceramics and plastics (including thermoplastic (such as PVC, polystyrene and cellulose-coated surfaces), thermosets and composite materials). Wood substrates may also be suitable (including engineered woods, impregnated woods and wood-derived materials), but typically only when the wood surface has been sealed or varnished or similarly treated to avoid or minimise water absorption. Preferably, the surface is a non-porous surface. Preferably, the term "non-porous surface" as used herein refers to a surface which does not absorb water, i.e. wherein water does not soak into the surface upon application.

According to a further aspect of the invention, there is provided a substrate exhibiting a decorated surface, the decorated surface being a surface on which is disposed a paint coating derived from a paint composition as described herein, preferably wherein the surface is non-porous and/or selected from metal or metallic surfaces, glass, ceramics and plastic as described herein.

Remover Composition and Removal Process

The remover composition of the paint system of the present invention is formulated to remove the paint coating from the substrate as efficiently as possible without damaging the substrate during removal. The preferred remover composition is also environmentally friendly and water-based, rather than the solvent-based paint-remover compositions conventional in the art. Thus, while conventional paint removers, such as turpentine, may be used to remove the paint compositions of the present invention from a substrate, they are highly toxic, and environmentally unfriendly and may result in at least some damage to the substrate.

After application to the painted substrate, the remover composition permeates through the paint coating to the interface between the paint coating and the substrate. The remover composition functions to break the adhesive bond between the paint coating and the substrate, and optionally also breaks the cohesive bonds within the paint coating.

The remover composition may be formulated as a liquid (as appropriate to the desired delivery format thereof). Alternatively, the remover composition may be formulated as a gel, to enable it to remain in contact with the painted substrate even on vertical surfaces.

According to a further aspect of the invention, the remover composition comprises:
  (i) water, preferably in an amount of at least 70 wt %, preferably at least 80 wt %, preferably at least 90 wt %, by weight of the composition;
  (ii) a base, preferably in an amount of no more than about 20 wt %, preferably no more than about 15 wt %, preferably no more than about 10 wt %, typically no more than about 7.0 wt %, typically no more than about 5.0 wt %, preferably at least about 0.2 wt %, preferably at least about 0.5 wt %, preferably at least about 1.0 wt %, preferably at least about 2.0 wt %, by weight of the composition;
  (iii) preferably, a rheology modifier, preferably in an amount of no more than about 10 wt %, preferably no more than about 5.0 wt %, preferably no more than about 2.0 wt %, preferably no more than about 1.0 wt %, and preferably at least about 0.2 wt %, preferably at least about 0.5 wt %, by weight of the composition;
  (iv) preferably, a wetting agent or surfactant, preferably in an amount of no more than about 10 wt %, preferably no more than about 5.0 wt %, preferably no more than about 2.0 wt %, preferably no more than about 1.0 wt %, and preferably at least about 0.1 wt %, preferably at least about 0.2 wt %, typically at least about 0.5 wt %, by weight of the composition; and
  (v) optionally, a biocide, preferably in an amount of no more than about 0.5 wt %, by weight of the composition.

The base is the principal active component in the remover composition. The remover composition may comprise one or more bases. The bases suitable for use in the present invention are preferably compounds which are capable of effecting base hydrolysis. The base is preferably soluble in water. The base is preferably a compound which is capable of hydrolysing the polymeric binder of the paint coating derived from the paint composition described herein.

Without being limited by theory, it is the inventors' understanding that application of the remover composition to said paint coating causes the base to hydrolyse the polymeric binder, resulting in bond cleavage of the chemical bonds of the polymeric bonder. Bond cleavage may occur in the bonds formed by the polymeric binder in said paint coating and/or in the bonds within polymeric binder molecules. For effective paint removal, bond cleavage suitably occurs at least in the bonds formed by the polymeric binder in said paint coating.

Any suitable base may be used. Preferably, the base is a weak base, i.e. a base which is only partially dissociated or ionized in solution, as per the conventional definition in the art. Preferably a weak base is one wherein the conjugate acid exhibits a pKa of no more than about 15.0, preferably no more than about 12.0, preferably no more than about 10.0.

Suitable bases for use in the remover composition include metal oxides, hydroxides and alkoxides, and salts (suitably metal salts, typically wherein the metal is an alkali metal or alkaline earth metal) of the counter-ions of weak acids. A weak acid is used herein to mean an acid which is only partially dissociated or ionized in solution, in accordance with its conventional meaning in the art, and preferably wherein the pKa of the weak acid is greater than 2.0, and typically from 2.0 to about 15.0 or from about 2.0 to about 10.0 or from about 2.0 to about 7.0.

Suitable bases include sodium meta-silicate, tri-sodium phosphate, sodium carbonate, sodium hydroxide and the like, or the corresponding salts of potassium or calcium or the other alkali metals and alkaline earth metals. Other suitable bases are ammonium hydroxide and liquid ammonia. Other suitable bases are organic bases such as amines and amino alcohols. A preferred class of base is the aminoalcohols, preferably ethanolamines, such as mono-ethanolamine (MEA), di-ethanolamine (DEA) or tri-ethanolamine (TEA) and, of these, mono-ethanolamine is preferred.

The pKa values referred to herein are the pKa values in water (measured at ambient temperature and pressure, preferably at 1 atm and 25° C.).

The rheology modifier is, or acts as, a gelling agent. It increases the viscosity of the remover composition.

Any suitable rheology modifier may be used, particularly those conventionally used in paint formulations. The rheology modifier is preferably selected from: polyurethanes; acrylic polymers; latex; styrene/butadiene copolymers; polyvinyl alcohol; clays (including, for instance, attapulgite, bentonite and other montmorillonite clays); cellulose and cellulose derivatives, including carboxymethylcellulose (CMC) (typically in the form of its sodium salt), hydroxymethyl cellulose (HMC), hydroxyethyl cellulose (HEC), hydroxypropyl cellulose (HPC), (hydroxyethyl)methyl cellulose (HEMC), (hydroxypropyl)methyl cellulose (HPMC) and other chemically substituted cellulose macromolecules; calcium or sodium sulfonates; polysaccharides and their derivatives (for instance, carrageenan, pullulan, konjac, and alginate, sometimes called hydrocolloids, and including kappa carrageenan which is of particular utility because of its gel-forming capability); gums (for instance, guar, xanthan, cellulose, locust bean, and acacia gum); proteins (including cassein, collagen and albumin); modified castor oil (typically modified via substitution of its hydroxyl groups); and organosilicones (including silicone resins, dimethicones, and modified silicones).

In a preferred embodiment, the rheology modifier is selected from polysaccharides and derivatised polysaccharides. In a further preferred embodiment, the rheology modifier is selected from gums, for instance, guar, xanthan, cellulose, locust bean, and acacia gum, and preferably from xanthan gum. This embodiment has been observed to produce a surprisingly effective remover composition, in which the gum acts synergistically with the base (particularly ethanolamines, particularly MEA).

The remover composition preferably further comprises a wetting agent or surfactant, preferably in amounts of no more than about 10 wt %, preferably no more than about 5 wt %, preferably no more than about 2 wt %, typically no more than about 1 wt %, and preferably at least about 0.1 wt %, preferably at least about 0.2 wt %, typically at least about 0.5 wt %, by weight of the composition. The remover composition may optionally further comprise an emulsifier in these amounts. Any wetting agent or surfactant suitable for use in aqueous media may be used, and anionic, non-ionic and cationic surfactants which are water-soluble are well-known in the art. Non-ionic surfactants have been found to be particularly useful. Examples of wetting agents include alkoxylates (such as ethoxylates, including secondary alcohol ethoxylates), phosphate esters, sodium resinate, fatty acid soaps, sulfonated fatty acid amide derivatives, sulfosuccinates, sodium lignosulfonate and petroleum sulfonates.

Any suitable biocide conventional in the art may be utilised. Preferably the remover composition does not comprise a biocide.

Preferably the remover composition is biodegradable. Biodegradability is preferably assessed according to the OECD 301B Zahn Wellens test to determine the % COD (Chemical Oxygen Demand) degradation at 20-25° C. Preferably, the remover composition of the present invention exhibits at least 90% soluble COD removal within 72 hours and at least 99% soluble COD removal within 7 days. The total COD in the material is suitably in the range of from about 40-50 g/L.

The remover composition may be applied to the painted surface by any appropriate technique, for instance as described herein for the paint composition, and particularly by spraying, brushing, sponging or cloth. The remover composition is preferably applied liberally to ensure adequate coverage over the painted substrate. The remover composition is allowed to react with the paint coating on the substrate for an appropriate time, suitably up to about 30 minutes, preferably no more than about 20 minutes, preferably no more than about 10 minutes, preferably no more than about 7 minutes, suitably 2-30 minutes, preferably 5-20 minutes, preferably 5-10 minutes, and more preferably about 5-7 minutes. The remover composition penetrates the paint coating and disables the adhesive bond to the surface.

Once the remover composition and the paint coating have reacted, the residue is removed by any appropriate technique, including wiping (for instance, using a spray or cloth), spraying or rinsing, and combinations thereof. Spraying or rinsing is preferably conducted using water. Preferably, the residue is first wiped from the surface to remove the bulk of the residue, followed by spraying (preferably with water) or wiping with a damp cloth (preferably dampened with water) to remove the remainder of the residue.

According to a further aspect of the invention, there is provided a method of temporarily decorating a surface comprising the steps of:

(i) applying a paint composition as defined herein to a surface of a substrate;

(ii) allowing the paint composition to dry to provide a paint coating on the surface of the substrate and hence a decorated surface on the substrate;

(iii) when it is desired to remove the paint coating from the substrate, applying a remover composition to the decorated surface and allowing the remover composition to react with the paint coating; and (iv) removing the residue from the surface of the substrate.

According to a further aspect of the invention, there is provided a paint system comprising a first component and a second component, wherein said first component is a paint composition as described herein, and wherein said second component is a remover composition as described herein for removing said first component from a surface of a substrate, wherein said first and second components are separate compositions. Preferably, the paint system comprises a first container which contains said first component and further comprises a second container which contains said second component. Thus, it will be appreciated from the description herein that the paint system of the invention is a temporary paint system, particularly a weather-resistant temporary.

According to a further aspect of the invention, there is provided an unpigmented coating composition comprising or consisting or consisting essentially of:

(i) an organic solvent component comprising or consisting of one or more organic solvent(s);

(ii) a polymeric component comprising a polymeric binder; and (iii) optionally one or more acid(s), wherein said organic solvent component, said polymeric component and said one or more acid(s) are as defined hereinabove.

Thus, said unpigmented coating composition does not comprise the pigment component as defined hereinabove. The term "unpigmented" means that the composition does not comprise pigment added to the composition in addition to said organic solvent component, said polymeric component and said one or more acid(s). The unpigmented composition is thus preferably clear or transparent. A coating derived from said unpigmented coating composition preferably exhibits a % of scattered visible light (haze) of no more than 15%, and preferably no more than 10%, and/or a total luminous transmission over the visible range (TLT) of at least 60%, preferably at least 70%, preferably at least 80%, and preferably at least 90%, measured according to the ASTM D 1003.

The other characteristics, including formulation, optional ingredients, delivery format, methods of manufacture and application, and thickness of the unpigmented coating compositions and coatings derived therefrom are otherwise the same as the paint composition described hereinabove. In particular, the unpigmented coating composition suitably comprises one or more UV-absorber(s), as well as other ingredients to enhance the stability and/or durability of the coating.

The unpigmented coating composition is advantageously used as an undercoat on porous substrates (such as untreated, unsealed or unvarnished wood) prior to application of a paint composition as defined hereinabove. Thus, the unpigmented coating composition is applied to the porous substrate, allowed to dry as described hereinabove, to provide a surface suitable for application of the removable paint composition described herein.

The unpigmented coating composition may also be advantageously used as an overcoat, in order to provide even greater durability to a decorated surface on which is disposed a paint coating derived from the paint composition described herein.

FIGURES

FIG. 1 shows an appropriate substrate (a), preferably non-porous, which is dry and preferably clean and dust-free FIG. 2 shows the application of a single coat of paint over an area (b), using a variety of methods (c) including professional sprayers, roller, paint brush, aerosol and paint pen.

FIG. 3 shows the dried painted surface (d), which is highly weather-resistant to a wide range of weather conditions (e), including sunshine, rain, snow and hail.

Figure 1:
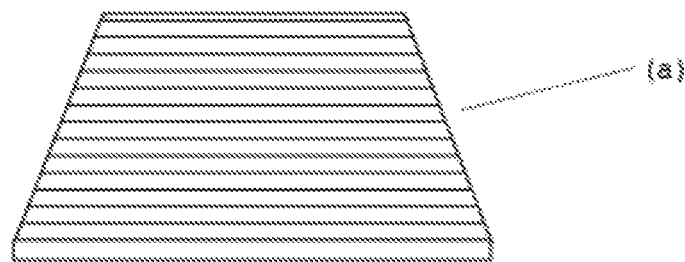
FIGS. 1 to 5 illustrate the use of the paint system of the present invention.
Figure 2:
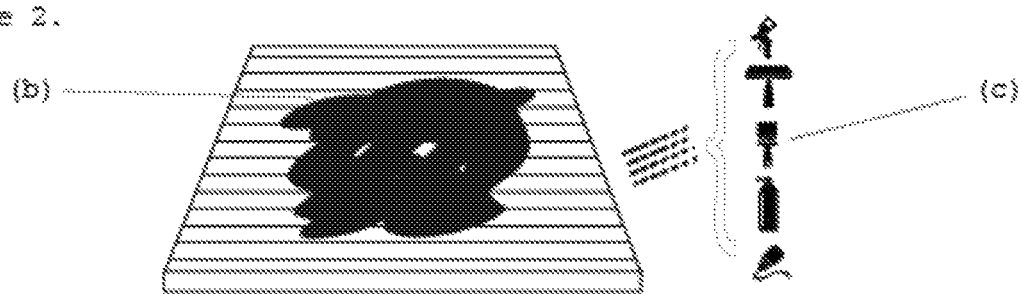
Figure 3:
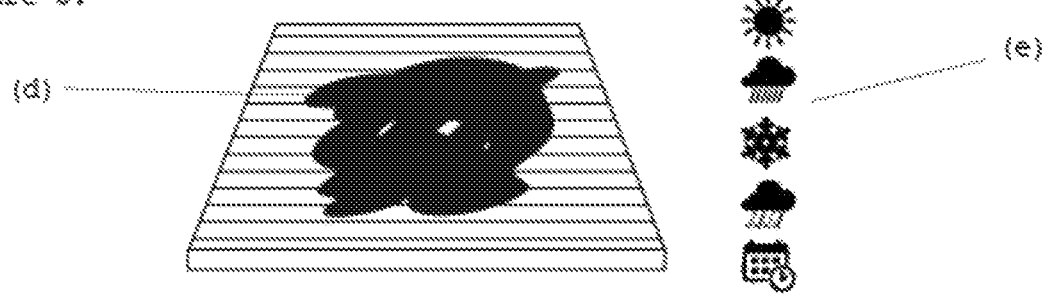
Figure 4:
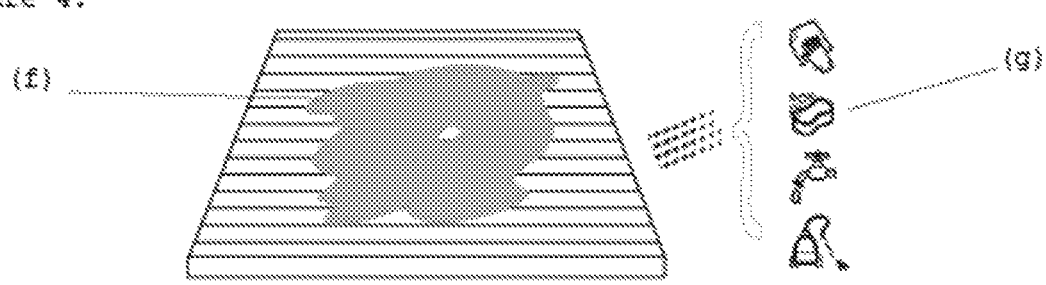

FIG. 4 shows the removal process. The remover composition (f) is applied to the painted surface and allowed to react with the paint coating for an appropriate time. The resultant composition is then removed from the surface by an appropriate technique (g), such as wiping, sponging, spraying or suction. The surface is then cleaned with water to remove any residual traces of paint and remover.

Figure 5:
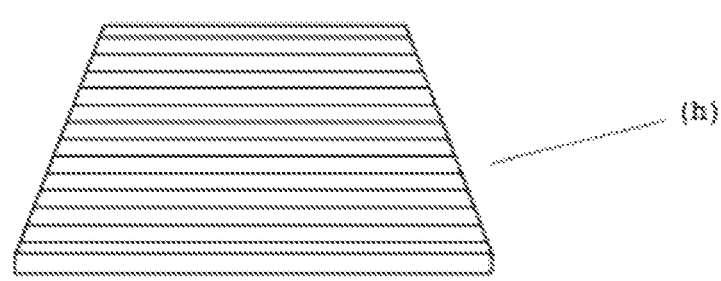

FIG. 5 shows the surface (h) from which the paint composition has been removed. The surface is undamaged with no markings or leaching.

EXAMPLES

Example 1

An acidified organic solvent was prepared by adding benzoic acid to denatured ethanol and mixing until the acid was fully dispersed into the ethanol. A polymeric binder comprising a copolymer comprising vinyl acetate and crotonic acid was added to the acidified organic solvent and mixed until the binder was fully dispersed to provide a clear liquid. A pigment dispersion was prepared comprising a black pigment, a condensation product of urea and aliphatic aldehyde as the resin base and methyl ethyl acetate as co-solvent. The pigment dispersion was then added to the clear liquid and mixed to provide a homogeneous paint composition. The weight ratio of the components in the paint composition was:

60 wt % organic solvent
0.5 wt % benzoic acid
20% wt % polymeric binder
19.5 wt % pigment dispersion.

In the pigment dispersion, the approximate weight ratio was: 16 wt % pigment, 71 wt % resin base, 4 wt % co-solvent and 9 wt % functional additive(s).

The paint composition was then diluted with acetone solvent. An aerosol spray-can was prepared according to conventional techniques known in the art by adding the diluted paint composition to a suitable can, together with dimethyl ether as the propellant. The final aerosol contained 30 wt % paint composition, 14 wt % acetone and 56 wt % DME.

A liquid remover composition was prepared by mixing monoethanolamine, xanthan gum and water in a weight ratio of about 5:1:94, and using a Silverson L2R high-shear mixer to provide a homogenous solution having a viscosity of 5800 cPs (measured at 10 rpm at 20° C.).

The paint composition was applied to a section of the metallic surface of a car bonnet using the aerosol spray. The paint composition was touch dry within 10 minutes, hardened with 1 hour and fully dry in 12 hours. The paint coating remained on the car bonnet within the confines of a garage for 24 hours. After that period, the liquid remover composition was applied using a cloth to the car bonnet, left for 6 minutes, and the bonnet then wiped using the cloth. The bonnet was then rinsed with a water spray to remove the remover composition and paint coating. On visual inspection, all traces of the paint coating had been removed, and no difference could be discerned between the section of the bonnet which had been painted and the section of the bonnet which had not been painted.

Example 2

A series of tests was conducted by repeating the procedure of Example 1 and leaving the paint coating on a metallic surface for longer periods of up to several months. The same result was observed for all time periods: the paint coating was completely removable from the surface using the remover composition without any visually discernible damage to, or residue on, the metallic surface.

Example 3

A series of tests was conducted by repeating the procedure of Example 2 except that the painted car bonnet was left outside and exposed to the elements for various periods of time and in various weather conditions, including sun, rain, hail and snow. The paint coating remained on the metallic surface without any fade or damage after 7 months. As before, the paint coating was completely removable from the surface using the remover composition without any visually discernible damage to, or residue on, the metallic surface.

Example 4

A series of tests was conducted by applying four different paint types, including the paint composition of Example 1 and all according to the present invention, to metallic substrates at temperatures ranging from 5° C. to 40° C. The painted surfaces were then subjected to 600 hrs exposure in an accelerated weatherometer (QUV), which is equivalent to 2 years external environmental exposure. In all cases, complete removability of the temporary paint coating was observed without any visually discernible damage to, or residue on, the surface.

Example 5

A further series of experiments corresponding to Example 1 was conducted using glass, ceramic and plastic substrates (PVC, polyethylene (HDPE) and polystyrene). In each case, the same result as in Example 1 was observed.

Various thicknesses of paint coating were used in these experiments, and determined by micrometer measurement to be from about 300 to about 600 μm in thickness.

Example 6

Example 1 was repeated using a white pigment component, prepared using a pigment dispersion having approximately 68 wt % pigment, 22 wt % resin base, 3 wt % co-solvent, and 7 wt % functional additive(s). The performance of the paint composition and aerosol matched that of Example 1.

Example 7

Example 1 was repeated except that the aerosol comprised 30 wt % paint composition, 35 wt % acetone and 35 wt % propane propellant. The performance of the paint composition and aerosol matched that of Example 1.

Example 8

A series of tests was conducted to assess the removability of the paint system of the present invention when applied over a variety of painted substrates, and over a prolonged period of time when subjected to exterior weathering, as well as to accelerated weathering under QUV conditions in a weatherometer. In order to simulate different climatic conditions, the removal of the paint from the various substrates was performed at low temp (4° C.), ambient temp (15° C.) and high temp (40° C.).

Thus, four conventional paints covering a broad spectrum of commonly used paint finishes were used to prepare test panels of a painted substrate. The conventional paints were:

(i) Single pack acrylic-based car spray paint (Halfords® Diamond White)

(ii) Nitrocellulose (iii) 2-pack acrylic-based car spray paint (OEM auto finish)

(iv) Alkyd-based enamel (Hammerite®).

Each of these four test paints was then directly coated on degreased and finely abraded mild steel Q panels to prepare test painted substrates, each coated with one coat of one of the test paints. Once coated, the painted panels were left to fully dry and harden for 7 days. A section (about two thirds of the surface area) of each of the painted panels was then over-coated by spraying with the paint composition of the present invention. A section (about one half) of the over-coated section was then over-coated with a second coat of the paint composition of the present invention, in order to allow an assessment of the removability of varying thicknesses of the paint composition. The prepared panels were then left for 7 days before the removability tests began.

A first set of test panels was placed in an accelerated weatherometer (QUV) and exposed to a standard cycle of UV, heat, moisture for 200, 400, 600 & 800 hours respectively.

A second set of test panels was placed outside on a south facing rig at a 45° angle and left to face the elements. Panels were tested for ease of removability after 1 month, 3 months, 6 months, 12 months and 18 months.

Removability of the paint composition of the present invention was assessed by applying the remover composition described hereinabove, using a 1" (approx. 2.54 cm) paint brush to three strips of each test panel in the sections where one and two coats of the paint composition of the present invention had been applied. Each panel was tested three times for paint removal: at 5° C.; at ambient temperature (approx. 17° C.); and 40° C., in order to mimic a variety of climatic conditions for paint removal, i.e. removal in winter, mild and hot sunny conditions. The time taken (in minutes (') and seconds (")) to remove the paint and degree of removal was recorded. The results are presented in Tables 1 to 4 below.

TABLE 1 painted substrate = single pack acrylic-based car spray paint

| | | Low temp (5° C.) | | Ambient temp (17° C.) | | High temp (40° C.) | |
|---|---|---|---|---|---|---|---|
| | | 1 Coat | 2 Coats | 1 Coat | 2 Coats | 1 Coat | 2 Coats |
| (a) QUV Tests | | | | | | | |
| 200 Hrs QUV Exposure | % Removal | 100% | 100% | 100% | 100% | 100% | 100% |
| | Time taken | 35" | 1'30" | 25" | 1'30" | <10" | <30" |
| 400 Hrs QUV Exposure | % Removal | 100% | 100% | 100% | 100% | 100% | 100% |
| | Time taken | 35" | 1'30" | 25" | 1'30" | <10" | <30" |
| 600 Hrs QUV Exposure | % Removal | 100% | 100% | 100% | 100% | 100% | 100% |
| | Time taken | 40" | 1'50" | 40" | 1'45" | <15" | <50" |
| 800 Hrs QUV Exposure | % Removal | 100% | 100% | 100% | 100% | 100% | 100% |
| | Time taken | 55" | 1'50" | 45" | 1'50" | <15" | <50" |
| (b) Exterior Tests | | | | | | | |
| 1 Month Exterior Exposure | % Removal | 100% | 100% | 100% | 100% | 100% | 100% |
| | Time taken | 35" | 1'35" | 25" | 1'30" | <10" | <30" |
| 3 Month Exterior Exposure | % Removal | 100% | 100% | 100% | 100% | 100% | 100% |
| | Time taken | 40" | 1'42" | 30" | 1'30" | <10" | <30" |
| 6 Month Exterior Exposure | % Removal | 100% | 100% | 100% | 100% | 100% | 100% |
| | Time taken | 43" | 1'50" | 35" | 1'35" | <10" | <45" |
| 12 Month Exterior Exposure | % Removal | 100% | 100% | 100% | 100% | 100% | 100% |
| | Time taken | 45" | 1'50" | 40" | 1'45" | <15" | <50" |
| 18 Month Exterior Exposure | % Removal | 100% | 100% | 100% | 100% | 100% | 100% |
| | Time taken | 45" | <2' | 40" | 1'50" | <15" | <50" |

TABLE 2 painted substrate = Nitrocellulose paint

| | | Low temp (5° C.) | | Ambient temp (17° C.) | | High temp (40° C.) | |
|---|---|---|---|---|---|---|---|
| | | 1 Coat | 2 Coats | 1 Coat | 2 Coats | 1 Coat | 2 Coats |
| (a) QUV Tests | | | | | | | |
| 200 Hrs QUV Exposure | % Removal | 100% | 100% | 100% | 100% | 100% | 100% |
| | Time taken | 35" | 1'30" | 25" | 1'30" | <10" | <30" |
| 400 Hrs QUV Exposure | % Removal | 100% | 100% | 100% | 100% | 100% | 100% |
| | Time taken | 35" | 1'30" | 25" | 1'30" | <10" | <30" |
| 600 Hrs QUV Exposure | % Removal | 100% | 100% | 100% | 100% | 100% | 100% |
| | Time taken | 40" | 1'50" | 40" | 1'45" | <15" | <50" |
| 800 Hrs QUV Exposure | % Removal | 100% | 100% | 100% | 100% | 100% | 100% |
| | Time taken | 55" | <2' | 45" | <2' | <15" | <50" |
| (b) Exterior Tests | | | | | | | |
| 1 Month Exterior Exposure | % Removal | 100% | 100% | 100% | 100% | 100% | 100% |
| | Time taken | 35" | 1'35" | 25" | 1'30" | <10" | <30" |
| 3 Month Exterior Exposure | % Removal | 100% | 100% | 100% | 100% | 100% | 100% |
| | Time taken | 40" | 1'45" | 25" | 1'38" | <10" | <30" |
| 6 Month Exterior Exposure | % Removal | 100% | 100% | 100% | 100% | 100% | 100% |
| | Time taken | 40" | 1'45" | 35" | 1'45" | <10" | <45" |
| 12 Month Exterior Exposure | % Removal | 100% | 100% | 100% | 100% | 100% | 100% |
| | Time taken | 45" | 1'50" | 40" | 1'50" | <15" | <50" |
| 18 Month Exterior Exposure | % Removal | 100% | 100% | 100% | 100% | 100% | 100% |
| | Time taken | 45" | <2' | 40" | <2' | <15" | <50" |

TABLE 3 painted substrate = 2-pack acrylic spray paint

| | | Low temp (5° C.) | | Ambient temp (17° C.) | | High temp (40° C.) | |
|---|---|---|---|---|---|---|---|
| | | 1 Coat | 2 Coats | 1 Coat | 2 Coats | 1 Coat | 2 Coats |
| (a) QUV Tests | | | | | | | |
| 200 Hrs QUV Exposure | % Removal | 100% | 100% | 100% | 100% | 100% | 100% |
| | Time taken | 35" | 1'30" | 25" | 1'30" | <10" | <30" |
| 400 Hrs QUV Exposure | % Removal | 100% | 100% | 100% | 100% | 100% | 100% |
| | Time taken | 35" | 1'30" | 25" | 1'30" | <10" | <30" |

TABLE 3-continued painted substrate = 2-pack acrylic spray paint

| | | Low temp (5° C.) | | Ambient temp (17° C.) | | High temp (40° C.) | |
|---|---|---|---|---|---|---|---|
| | | 1 Coat | 2 Coats | 1 Coat | 2 Coats | 1 Coat | 2 Coats |
| 600 Hrs QUV Exposure | % Removal | 100% | 100% | 100% | 100% | 100% | 100% |
| | Time taken | 40" | 1'40" | 30" | 1'30" | <15" | <50" |
| 800 Hrs QUV Exposure | % Removal | 100% | 100% | 100% | 100% | 100% | 100% |
| | Time taken | 45" | <2' | 35" | 1'40" | <15" | <50" |
| (b) Exterior Tests | | | | | | | |
| 1 Month Exterior Exposure | % Removal | 100% | 100% | 100% | 100% | 100% | 100% |
| | Time taken | 35" | 1'30" | 25" | 1'30" | <10" | <30" |
| 3 Month Exterior Exposure | % Removal | 100% | 100% | 100% | 100% | 100% | 100% |
| | Time taken | 34" | 1'34" | 25" | 1'30" | <10" | <30" |
| 6 Month Exterior Exposure | % Removal | 100% | 100% | 100% | 100% | 100% | 100% |
| | Time taken | 40" | 1'40" | 30" | 1'30" | <10" | <30" |
| 12 Month Exterior Exposure | % Removal | 100% | 100% | 100% | 100% | 100% | 100% |
| | Time taken | 40" | 1'40" | 30" | 1'30" | <15" | <50" |
| 18 Month Exterior Exposure | % Removal | 100% | 100% | 100% | 100% | 100% | 100% |
| | Time taken | 45" | <2' | 40" | 1'50" | <15" | <50" |

TABLE 4 painted substrate = Alkyd-based enamel paint

| | | Low temp (5° C.) | | Ambient temp (17° C.) | | High temp (40° C.) | |
|---|---|---|---|---|---|---|---|
| | | 1 Coat | 2 Coats | 1 Coat | 2 Coats | 1 Coat | 2 Coats |
| (a) QUV Tests | | | | | | | |
| 200 Hrs QUV Exposure | % Removal | 100% | 100% | 100% | 100% | 100% | 100% |
| | Time taken | 35" | 1'30" | 25" | 1'30" | <10" | <30" |
| 400 Hrs QUV Exposure | % Removal | 100% | 100% | 100% | 100% | 100% | 100% |
| | Time taken | 35" | 1'30" | 25" | 1'30" | <10" | <30" |
| 600 Hrs QUV Exposure | % Removal | 100% | 100% | 100% | 100% | 100% | 100% |
| | Time taken | 40" | 1'40" | 40" | 1'45" | <15" | <50" |
| 800 Hrs QUV Exposure | % Removal | 100% | 100% | 100% | 100% | 100% | 100% |
| | Time taken | 55" | 1'50" | 45" | 1'50" | <15" | <50" |
| (b) Exterior Tests | | | | | | | |
| 1 Month Exterior Exposure | % Removal | 100% | 100% | 100% | 100% | 100% | 100% |
| | Time taken | 35" | 1'35" | 25" | 1'30" | <10" | <30" |
| 3 Month Exterior Exposure | % Removal | 100% | 100% | 100% | 100% | 100% | 100% |
| | Time taken | 40" | 1'40" | 40" | 1'40" | <10" | <30" |
| 6 Month Exterior Exposure | % Removal | 100% | 100% | 100% | 100% | 100% | 100% |
| | Time taken | 43" | 1'50" | 35" | 1'35" | <10" | <45" |
| 12 Month Exterior Exposure | % Removal | 100% | 100% | 100% | 100% | 100% | 100% |
| | Time taken | 45" | 1'50" | 40" | 1'45" | <15" | <50" |
| 18 Month Exterior Exposure | % Removal | 100% | 100% | 100% | 100% | 100% | 100% |
| | Time taken | 45" | <2' | 40" | 1'50" | <15" | <50" |

The results demonstrate that after up to 800 hours of accelerated ageing (QUV exposure), both the single-coated and the double-coated layers of the paint composition of the present invention are completely removable from all four of the painted test substrates, and at all temperatures tested. Corresponding results are obtained after 18 months of exterior exposure.

The temperature at which removal is conducted marginally affects the removal time, with the general trend being that removal takes slightly longer at lower temperature and with greater thickness of the coating of the paint composition of the present invention. Typically a single coat of paint was fully removable at high temperature within 10 to 15 seconds, whereas a double coat of paint was fully removable at low temperature within 1 minute 40 seconds to 2 minutes.

No damage was observed on any of the painted substrates after removal of the paint composition of the present invention.

The paint composition of the present invention remained adhered to the test substrates without peeling or flaking for the duration of the weathering period.

The paint composition of the present invention also acted as a barrier coat to the painted substrates, i.e. when the paint composition was removed, the underlying surface generally remained in very good condition compared to the sections of the panels which had not been covered with a paint composition of the present invention and which had been subjected to weathering.

In summary, the paint composition of the present invention is suitable for application to a variety of different painted substrates and remains intact for a prolonged period of time and when exposed to a variety of weather conditions.

The paint was removable when required under various temperatures and film thicknesses without causing damage to the underlying film.

The invention claimed is:

1. A paint system comprising a first component and a second component wherein said first and second components are separate compositions, wherein said first component is a paint composition comprising:
   (i) an organic solvent component comprising or consisting of one or more organic solvent(s) wherein said organic solvent component is present in an amount of from 40 to 70% by weight of said paint composition, and wherein said organic solvent component comprises one or more organic solvent(s) in an amount of at least 90% by weight of the organic solvent component;
   (ii) a polymeric component comprising a polymeric binder wherein said polymeric component is present in an amount of from about 10 to about 30% by weight of said paint composition;
   (iii) a pigment component wherein said pigment component is present in an amount of at least about 1% by weight of said paint composition; and
   (iv) one or more acid(s) in an amount of from about 0.1 to about 1.0% by weight of said paint composition, wherein said paint composition is in the form of an aerosol, and wherein said second component is a remover composition for removing said first component from a surface of a substrate wherein said remover composition comprises:
   (i) water and
   (ii) a base.

2. The paint system according to claim 1 wherein upon application to a substrate, the cohesive force between the pigment component and the polymeric binder is greater than the adhesive force of the pigment component to the substrate onto which the paint composition is applied, and/or the polymeric binder substantially prevents adhesive contact between the pigment component and the substrate, and/or the polymeric binder forms a protective intermediate coating layer between the pigment component and the substrate.

3. The paint system according to claim 1 wherein said organic solvent component of the paint composition comprises or consists of one or more alcohol(s), and optionally further comprises water.

4. The paint system according to claim 3 wherein said alcohol is selected from ethanol, n-propyl alcohol, isopropyl alcohol, n-butyl alcohol, iso-butyl alcohol, tert-butyl alcohol, 2-methyl butanol, isoamyl alcohol and other primary amyl alcohol isomers, n-pentanol, 2-ethylhexanol, 4-hydroxy-2,6,8-trimethylnonane or diisobutyl carbinol.

5. The paint system according to claim 1 where said polymeric binder of said paint composition is thermoplastic and/or water-soluble or water-dispersable.

6. The paint system according to claim 1 wherein the polymeric binder comprises at least one type of monomer selected from mono-olefinically unsaturated carboxylic acids;
   and/or wherein the polymeric binder comprises at least one type of monomer selected from mono-olefinically unsaturated carboxylic acid esters or vinyl esters of carboxylic acids.

7. The paint system according to claim 1 wherein the polymeric binder of said paint composition comprises a repeating unit derived from a monomer comprising one or more group(s) selected or derived from carboxylic acid, sulphonic acid and phosphoric acid groups.

8. The paint system according to claim 7 wherein said monomer is an unsaturated mono- or di-carboxylic acid of formula (I):

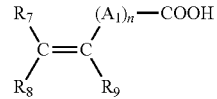

wherein:
n is an integer from 0 to 10;
$A_l$ is a methylene group
R7 is selected from H, —COOH, —CH$_2$—COOH, phenyl or benzyl;
R8 is selected from H, lower alkyl, —COOH or —CH$_2$—COOH; and
R9 is selected from H, lower alkyl, —CH$_2$—COOH, phenyl or benzyl.

9. The paint system according to claim 7 wherein the polymeric binder is a homopolymer or copolymer comprising a repeating unit derived from a monomer comprising one or more group(s) selected or derived from a sulphonic acid group, and wherein the monomer is selected from the group consisting of vinylsulphonic, styrenesulphonic, naphthalenesulphonic, acrylamidoalkylsulphonic acids and salts thereof.

10. The paint system according to claim 7 wherein the polymeric binder comprises one or more additional comonomer(s).

11. The paint system according to claim 1 wherein the polymeric binder of said paint composition is selected from the group consisting of homopolymers and copolymers of N-vinylpyrrolidone.

12. The paint system according to claim 1 wherein the polymeric binder of said paint composition is selected from non-hydrolyzed or partially hydrolyzed polyvinylacetates.

13. The paint system according to claim 1 wherein the polymeric binder of said paint composition is selected from:
   (A): Homopolymers and copolymers of acrylic and methacrylic acid and salts thereof, copolymers of acrylic acid and acrylamide and salts thereof, and sodium salts of polyhydroxycarboxylic acids;
   (B): Copolymers of acrylic and/or methacrylic acid with at least one mono-ethylenic monomer;
   (C): Crotonic acid copolymers;
   (D): Copolymers of mono-unsaturated $C_{4-8}$ carboxylic acids or anhydrides selected from copolymers comprising (i) at least one first unit chosen from the group consisting of maleic, fumaric, itaconic acids, and anhydrides thereof and (ii) at least one second unit chosen from the group consisting of vinyl esters, vinyl ethers, vinyl halides, phenylvinyl derivatives, acrylic acid and esters; or
   (E): Polyacrylamides comprising at least one carboxylate group.

14. The paint system according to claim 1 wherein the polymeric binder of said paint composition is selected from:
   (i) methacrylic acid/ethyl acrylate copolymers;
   (ii) methacrylic acid/ethyl acrylate/tert-butyl acrylate terpolymers;
   (iii) acrylic acid copolymers;
   (iv) methacrylic acid/methyl methacrylate copolymers;
   (v) methacrylic acid/acrylic acid/ethyl acrylate/methyl methacrylate copolymers;
   (vi) vinyl acetate/crotonic acid copolymers;

(vii) crotonic acid polymers selected from vinyl acetate/ crotonic acid/vinyl propionate copolymers, vinyl acetate/vinyl tert-butylbenzoate/crotonic acid terpolymers or crotonic acid/vinyl acetate/vinyl neodecanoate terpolymers;

(viii) vinyl acetate/crotonic acid copolymers grafted with polyethylene glycol;

(ix) polymers derived from maleic, fumaric or itaconic acids or anhydrides thereof with vinyl esters, vinyl ethers, vinyl halides, phenylvinyl derivatives, acrylic acid and esters thereof; and (x) vinylpyrrolidone/acrylic acid/lauryl methacrylate terpolymers.

15. The paint system according to claim 1 wherein the polymeric binder of said paint composition is selected from:
    (i) vinyl acetate/crotonic acid copolymers; and
    (ii) crotonic acid/vinyl acetate/vinyl neodecanoate terpolymers.

16. The paint system according to claim 1 wherein said acid of said paint composition is an aromatic or aliphatic carboxylic acid.

17. The paint system according to claim 1 wherein said pigment component of said paint composition is a dry pigment dispersion, wherein said pigment dispersion comprises pigment, and a resin base and/or a co-solvent such that the pigment is present in an amount of from about 10 to 70 wt % by total weight of the pigment component, and the resin base is present in an amount of from about 5 to about 75 wt % by total weight of the pigment component.

18. The paint system according to claim 1 wherein the polymeric binder of the paint composition does not cure or undergo chemical reaction upon application of the paint composition to a surface.

19. The paint system according to claim 1 wherein said remover composition comprises:

water in an amount of at least 70 wt %, by weight of the remover composition; and (ii) a base in an amount of no more than about 20 wt %, and at least about 0.2 wt % by weight of the remover composition wherein the base is a weak base for which the conjugate acid exhibits a pKa of no more than 12.0 and wherein the base is selected from metal oxides, hydroxides and alkoxides, and salts of the counter-ions of weak acids; sodium meta-silicate, tri-sodium phosphate, sodium carbonate, sodium hydroxide and the corresponding salts of potassium or calcium or other alkali metals and alkaline earth metals, ammonium hydroxide; liquid ammonia; organic bases selected from amines and amino alcohols, optionally a rheology modifier in an amount of no more than about 10 wt %, and at least about 0.2 wt % by weight of the remover composition, wherein said rheology modifier is selected from: polyurethanes; acrylic polymers; latex; styrene/butadiene copolymers; polyvinyl alcohol; clays; cellulose and cellulose derivatives; calcium or sodium sulfonates; polysaccharides and their derivatives; gums; proteins; modified castor oil; or organosilicones;

(iv) optionally a surfactant in an amount of no more than about 10 wt % and at least about 0.1 wt % by weight of the remover composition, wherein the surfactant is selected from alkoxylates, phosphate esters, sodium resinate, fatty acid soaps, sulfonated fatty acid amide derivatives, sulfosuccinates, sodium lignosulfonate or petroleum sulfonates; and (v) optionally a biocide in an amount of no more than about 0.5 wt %, by weight of the remover composition.

20. The paint system according to claim 1 which is a weather-resistant temporary paint system wherein said first component is a weather-resistant removable temporary paint composition and said second composition is a remover composition.

21. The paint system according to claim 1 wherein said acid of the paint composition is selected from benzoic acid, terephthalic acid isophthalic acid, and phthalic acid.

* * * * *